(12) United States Patent
Donohue et al.

(10) Patent No.: US 12,467,311 B2
(45) Date of Patent: Nov. 11, 2025

(54) INSULATED GLASS UNIT MANUFACTURING STATION AND ASSEMBLY LINE WITH CONTROLLED HEATING OF SPACER

(71) Applicant: Erdman Automation Corporation, Princeton, MN (US)

(72) Inventors: Morgan Donohue, North Oaks, MN (US); Carl D. Enger, St. Francis, MN (US); Dale J. Hatch, Milaca, MN (US); Larry M. Berning, Buffalo, MN (US)

(73) Assignee: Erdman Automation Corporation, Princeton, MN (US)

( * ) Notice: Subject to any disclaimer, the term of this patent is extended or adjusted under 35 U.S.C. 154(b) by 284 days.

(21) Appl. No.: 17/574,336

(22) Filed: Jan. 12, 2022

(65) Prior Publication Data
US 2023/0220723 A1     Jul. 13, 2023

(51) Int. Cl.
*E06B 3/673* (2006.01)
*C03C 27/10* (2006.01)
(Continued)

(52) U.S. Cl.
CPC ............ *E06B 3/6736* (2013.01); *C03C 27/10* (2013.01); *E06B 3/66342* (2013.01);
(Continued)

(58) Field of Classification Search
CPC ............ B29C 65/1412; B29C 65/1416; B29C 65/1419; B29C 65/1422; B29C 65/1612; B29C 65/1616; B29C 65/1619; B29C 65/1622; B29C 66/9121; B29C 66/91221; B29C 66/91411; B29C 66/91431; C03C 27/10; E06B 3/66342; E06B 3/67326; E06B 3/6736; E06B 3/67365; E06B 3/637391;
(Continued)

(56) References Cited

U.S. PATENT DOCUMENTS 4,071,344 A *   1/1978   Blausey, Jr. ........ C03B 27/0417
                                           65/DIG. 13
4,369,084 A     1/1983   Lisec
(Continued)

OTHER PUBLICATIONS

Application and File History for U.S. Appl. No. 14/474,865, filed Sep. 2, 2014. Inventor: Morgan Donohue.
(Continued)

*Primary Examiner* — John L Goff, II
(74) *Attorney, Agent, or Firm* — DeWitt LLP

(57) ABSTRACT

A heating station for use with, for example, a high speed parallel manufacturing line for manufacturing insulated glass units, the heating station including at least two opposing infrared heaters that linearly heat spacer material that includes integrated temperature sensitive adhesive. Each of multiple linear infrared heaters includes a respective associated temperature sensor. The infrared heater and temperature sensor are coupled to a spacer heating controller that controls intensity and/or duration of heating of the spacer material and adhesive to provide optimal wetting and adhesive qualities. Individual control of the at least two opposing linear infrared heaters compensates for variable environmental conditions affecting spacer material at different locations around and insulated glass unit.

9 Claims, 31 Drawing Sheets

(51) Int. Cl.
  *E06B 3/663* (2006.01)
  *G01J 5/10* (2006.01)
  *G05D 23/19* (2006.01)
  *G05D 23/27* (2006.01)
  *H05B 1/02* (2006.01)
  *H05B 3/00* (2006.01)

(52) U.S. Cl.
  CPC ............ *E06B 3/67365* (2013.01); *G01J 5/10* (2013.01); *G05D 23/193* (2013.01); *G05D 23/27* (2013.01); *H05B 1/023* (2013.01); *H05B 3/0038* (2013.01); *H05B 2203/032* (2013.01)

(58) Field of Classification Search
  CPC ....... E06B 2003/67378; E06B 3/67391; B32B 17/10871; G01J 5/10; G05D 23/193; G05D 23/27; H05B 1/023; H05B 3/0038; H05B 2203/032
  USPC .................................. 156/99, 106, 107, 109
  See application file for complete search history.

(56) References Cited

U.S. PATENT DOCUMENTS

| | | | |
|---|---|---|---|
| 4,406,726 A | 9/1983 | Lisec | |
| 4,422,541 A | 12/1983 | Lisec | |
| 4,434,024 A | 2/1984 | Lisec | |
| 4,441,907 A | 4/1984 | Nitschke | |
| 4,615,431 A | 10/1986 | Lisec | |
| 4,820,365 A | 4/1989 | Brumm | |
| 4,826,909 A | 5/1989 | Lakshmanan | |
| 4,886,095 A | 12/1989 | Lisec | |
| 4,921,022 A | 5/1990 | Lisec | |
| 5,110,337 A | 5/1992 | Lisec | |
| 5,173,148 A | 12/1992 | Lisec | |
| 5,280,832 A | 1/1994 | Lisec | |
| 5,413,156 A | 5/1995 | Lisec | |
| 5,476,124 A | 12/1995 | Lisec | |
| 5,542,805 A | 8/1996 | Lisec | |
| 5,626,712 A | 5/1997 | Lisec | |
| 5,645,678 A | 7/1997 | Lisec | |
| 5,676,782 A | 10/1997 | Lisec | |
| 5,685,437 A | 11/1997 | Lisec | |
| 5,704,405 A | 1/1998 | Lisec | |
| 5,803,943 A | 9/1998 | Parsons | |
| 5,815,273 A | 9/1998 | Lisec | |
| 5,823,732 A | 10/1998 | Lisec | |
| 5,878,866 A | 3/1999 | Lisec | |
| 5,888,341 A | 3/1999 | Lafond | |
| 5,932,062 A | 8/1999 | Manser | |
| 6,068,720 A | 5/2000 | McHugh | |
| 6,068,722 A * | 5/2000 | Yu | B29C 66/1122 156/304.6 |
| 6,077,018 A | 6/2000 | Lisec | |
| 6,158,483 A | 12/2000 | Trpkovski | |
| 6,192,711 B1 | 2/2001 | Lisec | |
| 6,197,231 B1 | 3/2001 | Lisec | |
| 6,245,145 B1 | 6/2001 | Lisec | |
| 6,378,586 B1 | 4/2002 | Lafond | |
| 6,491,966 B1 | 12/2002 | Lisec | |
| 6,494,245 B1 | 12/2002 | Simone | |
| 6,553,653 B2 | 4/2003 | Hulings | |
| 6,609,611 B1 | 8/2003 | Lenhardt | |
| 6,793,971 B2 | 9/2004 | Trpkovski | |
| 6,898,833 B2 | 5/2005 | Ashton | |
| 7,008,492 B2 | 3/2006 | Lisec | |
| 7,207,250 B2 | 4/2007 | Lisec | |
| 7,252,188 B2 | 8/2007 | Lisec | |
| 7,402,096 B2 | 7/2008 | Lisec | |
| 7,690,870 B2 | 4/2010 | Lisec | |
| 7,713,600 B2 | 5/2010 | Lisec | |
| 7,807,003 B2 | 10/2010 | Schuler | |
| 7,938,924 B2 | 5/2011 | Lisec | |
| 8,114,232 B2 | 2/2012 | Lisec | |
| 8,480,940 B2 | 7/2013 | Schuler | |
| 8,622,110 B2 | 1/2014 | Lisec | |
| 8,910,453 B2 | 12/2014 | Jones | |
| 9,004,262 B2 | 4/2015 | Mader | |
| 9,656,356 B2 | 5/2017 | Pemberton | |
| 9,951,553 B2 | 4/2018 | Donohue | |
| 10,988,974 B2 | 4/2021 | Donohue | |
| 2003/0059532 A1 | 3/2003 | Vianello | |
| 2003/0146066 A1 | 8/2003 | Ashton | |
| 2003/0178127 A1 | 9/2003 | Lisec | |
| 2004/0209019 A1 | 10/2004 | Demars | |
| 2004/0232188 A1 | 11/2004 | Lisec | |
| 2004/0237737 A1 | 12/2004 | Lisec | |
| 2005/0011229 A1 | 1/2005 | Lisec | |
| 2005/0013950 A1 | 1/2005 | Trpkovski | |
| 2005/0247392 A1 | 11/2005 | Lisec | |
| 2006/0076110 A1 | 4/2006 | Lisec | |
| 2006/0180140 A1 | 8/2006 | Lisec | |
| 2006/0201606 A1 | 9/2006 | Lisec | |
| 2007/0131338 A1 | 6/2007 | Lisec | |
| 2007/0158381 A1 | 7/2007 | Lisec | |
| 2007/0275192 A1 | 11/2007 | Lisec | |
| 2009/0151855 A1 | 6/2009 | Wang | |
| 2009/0155499 A1 | 6/2009 | Cooper | |
| 2009/0311449 A1 | 12/2009 | Fehlmann | |
| 2010/0200164 A1 | 8/2010 | Lisec | |
| 2011/0154635 A1 | 6/2011 | Wunnicke | |
| 2011/0290295 A1 | 12/2011 | Veerasamy | |
| 2012/0037293 A1 | 2/2012 | Mader et al. | |
| 2012/0085499 A1 | 4/2012 | Mader et al. | |
| 2012/0094040 A1 | 4/2012 | Mader | |
| 2012/0199272 A1 | 8/2012 | Mader | |
| 2012/0230759 A1 | 9/2012 | Mader | |
| 2012/0261056 A1 | 10/2012 | Mader | |
| 2012/0285605 A1 | 11/2012 | Ripoche | |
| 2013/0040541 A1 | 2/2013 | Mader et al. | |
| 2013/0061978 A1 | 3/2013 | Donohue | |
| 2013/0099047 A1 | 4/2013 | Mader | |
| 2013/0140347 A1 | 6/2013 | Friedl | |
| 2014/0026619 A1 | 1/2014 | Maloney | |
| 2014/0087099 A1 * | 3/2014 | Veerasamy | C03C 27/08 156/64 |
| 2014/0109370 A1 | 4/2014 | Pemberton | |
| 2014/0352841 A1 | 12/2014 | Zurn | |
| 2015/0184447 A1 | 7/2015 | Queck | |
| 2015/0259970 A1 | 9/2015 | Briese | |
| 2015/0354266 A1 | 12/2015 | Donohue | |
| 2016/0298376 A1 | 10/2016 | Queck | |
| 2016/0325496 A1 * | 11/2016 | De Pena | B33Y 10/00 |
| 2017/0074032 A1 | 3/2017 | Briese | |
| 2017/0306690 A1 | 10/2017 | Donohue | |
| 2017/0327419 A1 * | 11/2017 | Boek | C01G 19/02 |
| 2018/0087313 A1 | 3/2018 | Donohue | |
| 2018/0230735 A1 | 8/2018 | Donohue | |

OTHER PUBLICATIONS

Application and File History for U.S. Appl. No. 15/134,588, filed Apr. 21, 2016. Inventor: Morgan Donohue.

Application and File History for U.S. Appl. No. 15/799,023, filed Oct. 31, 2017. Inventor: Morgan Donohue.

Application and File History for U.S. Appl. No. 16/909,391, filed Jun. 23, 2020. Inventor: Morgan Donohue.

* cited by examiner

INSULATED GLASS UNIT MANUFACTURING STATION AND ASSEMBLY LINE WITH CONTROLLED HEATING OF SPACER

TECHNICAL FIELD

The invention relates to production of insulated glass units. More specifically, the invention relates to production of insulated glass units manufactured with single seal spacer materials or spacer materials that have integrated adhesives.

BACKGROUND

Insulated glass is heavily utilized in modern residential and commercial construction. In many areas of the country it is required by building code as an energy conservation measure. A single pane of glass alone has very little insulating value. Multi-pane insulated glass windows have much greater insulating value. Insulated glass units generally include at least two panes of glass having identical shapes. Sealants and adhesives are used to bond the glass panes to a perimeter spacer which separates the two panes of glass. The entire perimeter including the two panes of glass and the spacer are sealed to one another to eliminate movement of ambient air into the space between the two panes of glass.

The space is filled with dehydrated air or more commonly another gas such as argon, xenon or krypton. Sulfur hexafluoride is also used for gas filling. The filling of insulated glass units with argon or another gas that is not air has been found to increase the energy efficiency of the insulated glass units markedly. Some insulated glass units includes three panes of glass with two intervening spaces which are similarly filled with argon or another gas other than air and then edge sealed.

The spacer in an insulated glass unit is inset from the peripheral edges of the glass panes leading to a trough shaped space bounded on two sides by the glass panes and on one side by the spacer. In the manufacturing of some insulated glass units, this space is filled with an adhesive sealant which forms the, so called, secondary seal of the insulated glass unit.

Recently, other primary sealing technologies have been developed. These edge sealing technologies utilize a primary seal that stands alone and produce an insulated glass unit that does not include a secondary seal. This may result in faster production and reduced cost for insulated glass units though the units may also have shorter lives and be useful in a narrower range of climatic conditions.

If present, the secondary seal may be applied using a variety of different adhesive sealants. These include time setting sealants, such as silicones or butyl rubber sealants. Sometimes two part sealants utilizing a resin and a catalyst to polymerize the resin are utilized. More commonly in modern manufacturing, hot melt adhesive sealants are used. Hot melt adhesive sealants are general applied in a liquid state at a temperature of approximately 350° F. and harden upon cooling to ambient temperature.

In high volume manufacturing facilities, the secondary seal is commonly applied by fully automated equipment in which a computer controlled robotic sealant applying head is moved around the peripheral edges of the insulated glass unit under computer control and applies the sealant to the edge or edges of the insulated glass unit. Fully automated secondary edge sealing equipment of this sort can apply the secondary seal to very large numbers of insulating glass units in a production run. Typically, the insulated glass units in these circumstances are produced in large runs of identical units.

The process of manufacturing insulated glass units generally includes infeed of glass panes or lites into a washing unit that cleans both surfaces of each pane and, in particular, the surface of each pane that will be on the interior of the insulated glass unit. This is particularly important because, once the insulated glass unit is complete the interior surfaces will be inaccessible to cleaning and any visible dirt is impossible to remove. Accordingly, the washing station is generally followed by an inspection station to assure that the panes are clean.

In the prior art, panes or lites are then conveyed in tandem fashion to further processing. The panes are divided into pairs, each pair including a spacer lite to which a peripheral spacer is applied and which forms the back of the IGU and a topping lite which will ultimately be applied on top of the spacer lite and sealed to the spacer to form the insulated glass unit. According to the prior art generally, the topping lite proceeds first in the pair and is followed by the spacer applied lite. When the spacer lite reaches a spacer application station the peripheral spacer is applied. The spacer lite and the topping lite are both advanced so that the topping lite can be removed from the conveyor. According to the prior art, the topping lite is picked up first at the gas press then the spacer applied lite is conveyed in and unit is gas filled and assembled. The primary sealed insulated glass unit is then conveyed to a secondary seal applicator to apply secondary sealant to the edges bordered by the spacer and the peripheral portions of the lites. The completed IGU is then conveyed to the end of the processing line for transport to next steps.

According to the prior art, the heads for application of spacer and sealant are stationary in the X axis and the glass lites or IGUs are moved relative to the fixed heads. Thus, the prior art requires that the glass to move though the zone three times. Once for application along bottom x axis moving forward, once across the top x axis moving backward and then removal forward to the next station.

The ambient environment in which the production of insulated glass units occurs can vary in temperature depending upon the location of the manufacturing facility and weather conditions. The adhesion of spacer materials that have contact adhesives incorporated in their structure referred to as single seal spacers such as, for example, spacers provided under the trade names Duraseal® and Duralite®, are affected by the temperature at which the spacer materials are applied.

There is a need for application devices in the window industry that facilitate adhesion in single seal spacer materials.

SUMMARY

The insulated glass unit manufacturing station and assembly line with control heating of the space are according to example embodiments of the invention solves many problems related to the manufacturer of insulated glass units. Embodiments of the invention facilitate many of the industry demands for higher cycle speed, shorter cycle time and automation of the manufacturing process as well as control of adhesion of adhesive bearing spacer materials to glass lites.

According to an example embodiment, the high speed line generally includes an infeed station, a glass washer, an inspection station, a shuttle, a driven parallel infeed conveyor, an insulated glass unit spacer applicator, a following queue station, a grid station followed by a second queue station, a gas filling station, a secondary edge sealer and an outfeed queue station. Embodiments of the invention are expected to permit a cycle time of approximately 15-20 second per unit as compared to the prior art cycle time of 25-30 seconds per unit. This cycle time is expected to be 33 to 50 percent of the prior art cycle time. Thus a doubling of production rate over the prior art is possible.

The infeed station is generally conventional and receives glass panes or lites generally fed to the line one at a time by an operator.

The washer is also generally conventional and according to an example embodiment of the invention, is generally vertically oriented so that lites are washed and dried in a generally vertical orientation. Vertical, in this case means that the lites are held in an orientation within about 25 degrees of true vertical, more typically within 6 to 10 degrees of vertical, for example six degrees from vertical.

The inspection station is also generally conventional and permits inspection of the washed glass for cleanliness and condition.

The shuttle according to an example embodiment of the invention is a double shuttle which distributes lites so that topping lites are in a back conveyor line and spacer applied lites are in a front conveyor line. According to one embodiment of the invention, the double shuttle minimizes shifting when glass lites are distributed to the front and back conveyor line.

Spacer applied lites are those to which a perimeter spacer will be or has been applied in the construction of an insulated glass unit (IGU). Topping lites are those that will be or have been applied to a perimeter spacer that is already joined to a spacer applied lite to form an IGU that is partially completed in that it has been primary sealed but no secondary sealant has been applied. An insulated glass unit (IGU) includes a spacer applied lite joined to a topping lite and a perimeter spacer sealed to both the spacer applied lite joined to a topping lite with air or another gas trapped in between. Some IGUs that are made with single seal spacers are not subject to a secondary seal process. In this case, the primary seal is the only seal between the spacer and the lites and the IGU without a secondary seal represents a complete IGU unit.

The driven parallel infeed conveyor is a queue conveyor and receives glass lites from the shuttle and conveys them to the insulated glass unit spacer applicator. Spacer applied lites are in a front conveyor line while topping lites are in a rear conveyor line. Separate conveying of the topping lites and the spacer applied lites eliminates time wasted conveying the topping lite through the spacer applied lite work areas and may save as much as five seconds of cycle time according to the invention.

The insulated glass unit spacer applicator receives lites from the parallel infeed conveyor and applies spacers to the spacer applied lite on the front conveyor line while conveying the topping lite behind the spacer applied lite. The IGU spacer applicator is structured so that a following spacer applied lite can be staged for the applicator prior to the finishing of the application of the spacer to the first spacer applied lite. Staging the following lite prior to finishing the prior lite saves about three seconds in cycle time.

According to an example embodiment of the invention, the spacer is applied while the lite is moving forward. Thus, the applicator head and glass are conveyed forward simultaneously at the same time that the applicator head is moving relative to the lite and applying the spacer. As compared to the prior art, the spacer applicator according to an embodiment of the invention eliminates backing up of the lite during the application process so that the lite is only moved forward continuously during the process. Applying the spacer while the spacer applied lite is moving a forward direction saves about five second in cycle time over the prior art approach.

According to an embodiment of the invention, the spacer or primary seal is applied to the bottom of the lite then to the trailing edge of the lite, the top edge of the lite and the leading edge of the lite in sequence. This occurs while the lite is moving forward so that the lite never is required to move backward or to stop the manufacturing line. The spacer applicator head moves in the x, y and z axes plus in a rotational fashion.

The spacer applied lite is conveyed through the spacer applicator by a servo-driven suction cup assembly structured to grip the lite and move the lite forward with variable speed while the spacer is applied. According to an example embodiment of the invention, the speed and rate of the servo-driven suction cup assembly are electronically controlled. The servo-driven suction cup assembly displaces the lite forward, in part, to accommodate staging of the following spacer applied lite.

The topping lite and spacer applied lite with spacer now applied exit to the following queue station prior to the optional grid application station.

The driven grid application station is generally conventional in structure and need not be further described here other than the grid application station has two conveyor lanes so the topping lite passes behind rather than through the grid application work zone. This arrangement permits the following spacer applied lite which may require a grid to be staged 5 seconds faster. The grid application station is used to place grids within the spacer of the spacer applied lite. The driven grid application station is optional and can be eliminated if grids are not desired.

The gas press with gas fill may include, according to embodiments of the invention, a single high speed gas press with a shuttle in the press or a double gas press including two gas filled chambers with a shuttle prior to and after the double gas press.

According to an embodiment of the invention, the double gas press includes two gas press compartments including a front gas press compartment and a back gas press compartment. Each of the front gas press compartment and the back gas press compartment include gas ducts and an internal conveyor.

According to one embodiment of the invention, the gas ducts are arranged to dispense gas from either the leading or trailing edge of the unit. The double gas press may include three platens including a front platen, a central platen shared by both compartments and a back platen. As it is operating, the front compartment receives a first topping lite from the back line. The front compartment then transfers the first topping lite from the central platen to the front platen while shuttling the front compartment to the front line. The front compartment receives a first spacer applied lite from the front line which is received on the central platen front side. The front gas press compartment then dispenses gas and mates the first topping lite with the first spacer applied lite creating a primary sealed insulated glass unit. Meanwhile, the back compartment is aligned with a back line and receives a second topping lite from the back line. The back compartment then shuttles to the front line where it receives a second spacer applied lite from the front line. The back compartment platens then move together while dispensing gas to mate the second topping lite with the second spacer applied lite. In sequence, each of the back compartment and the front compartment shuttle to alignment with the back line or the front line to convey the partially completed first and second insulated glass units. Because there are 2 chambers according to this embodiment, each gas fill chamber has 30-40 seconds to convey glass into each chamber, fill the IGU with gas, assemble and convey the assembled IGU out of the gas fill chamber. Accordingly, the production cycle can be maintained at 15-20 seconds. The glass units alternately load and unload each of the gas press chambers during each cycle. This longer time in each chamber allows for higher-than-average gas fill percentages without slowing production throughput. This represents yet another improvement over traditional lines where high gas fill percentages will slow the line's production.

According to another example embodiment of the invention, a single high speed gas press is used. According to an example embodiment the single high speed gas press generally includes a housing, a front platen with suction grippers, a back platen with suction grippers, side doors, an internal conveyor and gas ducts. According to embodiments of the invention, the gas ducts may be located below or on the leading edge side or the trailing edge side of the housing.

The single high speed gas press shuttles from the back line to the front line. In sequence, it receives a topping lite conveyed from the back line, transfers the topping lite from the back platen to the front platen and meanwhile shuttles to the front line. The single gas press then receives the spacer applied lite from the front line. Side doors of the single gas press close and the internal conveyor moves out of the way. Gas ducts are moved into position at the bottom or side as the internal conveyor is moved out of the way. Gas is then injected and the platens move to mate the topping lite to the spacer applied lite and press them together to establish a primary seal. The internal conveyor then moves back into place and the assembled insulated glass unit is conveyed out at the same time as a following topping lite is conveyed in.

The primary sealed, partially complete insulated glass unit then is conveyed to the secondary edge sealer.

According to an example embodiment of the invention, the secondary edge sealer is a two headed edge sealer. According to an example embodiment, an upper head applies secondary sealant to the leading edge, the top edge and the trailing edge of the insulated glass unit. The lower head applies secondary sealant to the bottom edge of the partially completed insulated glass unit. According to an embodiment of the invention, servo-driven cups grip and transport the insulated glass unit. The servo-driven cups also displace the insulated glass unit forward to permit staging of a following unit while the first unit is being edge sealed. According to an example embodiment of the invention, each of the upper and lower secondary edge sealing heads includes a corner wiper that eliminates or minimizes the need for operator touch-up of the insulating glass unit. This is particularly helpful with the short cycle time of the present invention as the operator is unlikely to have much time to touch-up due to the 15-20 second cycle time of the high speed parallel insulated glass manufacturing line. As compared to the prior art, there is no need for the IGU to be backed up and reconveyed through the secondary sealer. In the prior art, the IGU is generally conveyed through secondary sealer three times in a forward direction and moved in reverse two times. This represents a time savings of about five seconds over the conventional approach.

According to example embodiments of the invention, the two edge sealing heads are mounted on a short move x-gantry. The gantry is capable of moving in the x direction along with the IGU as the IGU is conveyed forward, for example, for about eight inches. This short move forward in the x direction allows for the finishing Y movement of the gantry to be slightly ahead of the starting y move. This allows the next IGU to be staged at the start point prior to the prior unit being completed. This feature saves up to 3 more seconds in cycle time.

According to example embodiments of the invention, secondary sealants are either hot melt sealants or two part sealant that set rapidly to support the short cycle times. More conventional sealants can be utilized as well.

The completed insulated glass units are then conveyed out to a driven or non-driven outfeed queue station where the operator moves the completed insulated glass unit for further processing.

According to another example embodiment, the high speed line generally includes an infeed station, a glass washer, an inspection station, a shuttle, a driven parallel infeed conveyor, an insulated glass unit spacer applicator that applies single seal spacers such as, for example, spacers provided under the trade names Duraseal® and Duralite®, a following queue station, a grid station optionally followed by a second queue station, a double auto topping press optionally with gas filling and an infeed shuttle, a heating station, a vertical platen press and a fourth corner sealer.

Similar to the above discussed embodiment, the infeed station is generally conventional and receives glass panes or lites generally fed to the line one at a time in a generally vertical orientation by an operator.

The washer is also generally conventional as discussed above. According to this example embodiment of the invention, is generally vertically oriented so that lites are washed and dried in a generally vertical orientation. Vertical, here, has the same meaning as discussed above with relation to the earlier embodiment.

The inspection station is also generally conventional and permits inspection of the washed glass for cleanliness and condition.

The shuttle according to this example embodiment is a double shuttle which distributes lites so that topping lites are in a back conveyor line and spacer applied lites are in a front conveyor line. Similar to the above embodiment, the double shuttle minimizes cycle time when glass lites are distributed to the front and back conveyor line.

The insulated glass unit spacer applicator according to this embodiment of the invention is adapted to apply a single seal spacer. According to this example embodiment, the spacer is applied while the lite is moving forward similar to the above discussed example embodiment. As above, the applicator head and glass are conveyed forward simultaneously at the same time that the applicator head is moving relative to the lite and applying the spacer. As compared to the prior art, the lite is only moved forward continuously during the process. Applying the spacer while the spacer applied lite is moving in a forward direction saves about five second in cycle time over a prior art approach.

According to this example embodiment of the invention, the single primary seal spacer is applied to the bottom of the lite, then to the trailing edge of the lite, the top edge of the lite and the leading edge of the lite in sequence. This occurs while the lite is moving forward so that the lite never is required to move backward or to stop the manufacturing line. The spacer applicator head moves in the x, y and z axes as well as in a rotational fashion along with the spacer applied lite while the spacer is applied.

Single primary seal spacers generally include a metal, flexible foam or composite spacer that is bounded on two edges by a contact sealant. A metal spacer material may be corrugated such that it can be bent around corners of the IGU. Thus, at least some single primary seal spacer materials require no notching to form corners.

The contact sealant may include, for example a butyl rubber sealant that is tacky at ambient room temperature of approximately 70 degrees F. Permanent adhesion of such a sealant is heat and pressure activated. Typically in the prior art, these spacers are utilized by assembling the insulated glass unit in a horizontal position and passing the assembled insulated glass unit through an oven to heat the insulated glass unit. The insulated glass unit is then pressed with a series of staged rollers that press the lites against the spacer and sealant and to cause the sealant to wet out and make a good seal. Accordingly, the entire IGU including the glass lites are heated and raised in temperature during the sealing process. This creates a number of disadvantages.

First, the ovens require the use of fans to circulate air and the fans cause additional energy consumption. Heating the entire unit also consumes considerable energy.

Second, if the IGU is completely sealed immediately, as the unit cools air or gas within the unit contracts and the spacers are forced inwardly away from the edges by atmospheric pressure. This can cause the spacers to be bowed rather than straight and parallel to the edges of the unit as well as causing the glass to bow inwardly. Prior art practice is then to leave a corner vent open in the IGU and to allow the unit to cool to ambient temperature before gas filling and then to seal the corner vent. Because it takes up to fifteen minutes for the IGUs to cool, considerable storage space is required. Storage requires much additional labor to handle the work in progress and the speed of production is reduced. Gas filling is then done manually requiring further labor and time as well as increasing the possibility of errors in manufacturing. Further, moving insulated glass units between horizontal and vertical orientations requires considerable effort and labor and creates ergonomic challenges including the possibility of injury to bones and joints of workers.

Embodiments of the invention include several features to address this problem.

First, the spacer applicator includes a temperature controlled spacer supply drum that stores the coiled spacer material and maintains it at a desired temperature usually above ambient temperature to maintain a desired level of wettability of the sealant that is part of the single sealant spacer material.

Second, a platen press or vertically oriented roller arrangement is preceded by infrared heating units that utilize focused infrared lamps to localize heating to the spacers, sealant and local area of the glass lites with which the sealant makes contact. According to one example embodiment of the invention the focused infrared lamps are movable and move along with the IGU on the line while heating the eight edges of the spacer material along the four edges of a rectangular IGU. According to another example embodiment, the focused infrared lamps are stationary but of sufficient length to heat the length and width of the largest IGU the system is capable of processing. According to an example embodiment the invention includes a vertical heater station and a horizontal heater station. According to an example embodiment, the vertical heater station includes at least two heaters that are oriented to heat vertical edges of the IGU on opposing sides of the IGU in which case the IGU is paused twice, once to heat the leading edge and once to heat the trailing edge of the IGU. Alternately, the vertical heater station includes two pairs of heating units that are adjustable for the length of the IGU and adjustable to be spaced apart by the distance from the leading edge of the IGU to the trailing edge of the IGU. The IGU is paused for a short time while the vertical edges are heated to facilitate wettability of the spacer adhesive.

The horizontal heater station includes two heaters that are adjustable as to separation such that the heaters are positioned over the upper and lower edges of the IGU to heat the upper and lower edges simultaneously. The IGU may continue to be moved along the conveyor while the upper and lower spacer regions are being heated.

It is expected that the lamps will have sufficient output to heat the spacer and sealant in 15 second or less. Heat output can be controlled generally by controlling voltage supplied to the lamps. The infrared heat lamps may be focused by the use of parabolic reflectors for example. Localized heating of just the spacer has several advantages. It uses approximately one fifth the energy of traditional ovens which heat the entire insulated glass unit. Because the glass is not heated the airspace is also unheated allowing the argon gas to be retained during the heating and pressing stages of the line. The elimination of the heating of the glass also allows the units to avoid the acclimation process presently needed prior to sealing the fourth corner. All of these items reduce handling and labor.

According to another embodiment, heating may be accomplished by placing the entire manufacturing line or a portion of the manufacturing line in a temperature controlled environment that maintains the spacer material and lites at a temperature for optimal adhesion and wettability of the sealant, for example 80-100° F.

Argon or other filling gas tends to cool as they expand from a compressed state in a pressure vessel. Accordingly, embodiments of the invention include an expansion manifold to allow the argon or other filling gas to reach ambient temperature prior to filling the IGU with gas. This is done so as not to reduce the temperature of the spacer and sealant material to a temperature at which the wettability of the sealant is less than desired.

A platen press has certain advantages when used to press the lites against the spacer and sealant in that it generally creates less rebound than a roller press. Because the unit is filled with argon or other gas but a corner is not yet sealed, rebound tends to displace argon and draw ambient atmosphere into the IGU which reduces the concentration or argon or other non-air gas. A vertical roller press may also be used. Vertical here has the meaning as discussed above. A vertical roller press tends to create more rebound but also maintains constant forward motion of the IGU during the pressing process and may contribute to reduced cycle times when gas retention is not a concern. In the situation discussed above, gas loss is a primary concern because it reduces thermal performance of the finished IGU.

Embodiments of the invention can use either a single press that assembles the IGU and presses it to final thickness or a first press that assembles the unit and fills the unit with gas followed by a second press that presses the unit to final thickness after heat has been applied to the spacer by application of infrared lamps. Furthermore, a double gas press may be utilized to increase throughput when gas filling, followed by heating zones that apply localize heat to the spacer material and adhesive. The IGU then is transferred to a platen press to press that presses the IGU to its final thickness dimension. In an alternate embodiment, a roller press can be used to press the IGU to its final thickness dimension.

The fourth corner sealer serves to close the fourth corner and may in several embodiments include an angled rocking device, a roller device or a two part angled press device.

The roller device is configured such that the roller applies a force against a first side of the fourth corner and passes around the corner to apply a force to the second side of the fourth corner.

The angled rocking device includes a corner pressing structure have two sides that meet at an angle greater than ninety degrees that is rocked over the corner to compress and seal both sides.

The two part angled press device includes two separate angled pressure heads that are applied to the two sides of the corner independently either in sequence of simultaneously to press the two sides of the corner together to achieve sealing.

It is to be noted related to this application that the term "parallel" is to be construed broadly and is not limited to "parallel" in the geometric sense of being equidistant at all points unless otherwise noted in the application of claims. Parallel may, for example, refer to two conveyor paths that begin and end at substantially the same locations but take different paths between the beginning and end.

It is expected that the high speed parallel process insulated glass manufacturing line according to an embodiment of the invention will have cycle times of approximately 17-18 seconds for insulated glass units depending upon size. It is possible that the high speed parallel insulated glass manufacturing line will be able to achieve cycle times of approximately 15 seconds per insulated glass unit. This is a significant gain over the prior art known to Applicant, more than doubling production without adding employees.

The high speed parallel insulated glass manufacturing line can be operated by three employees if no grids are installed and four employees if grids are installed. To accomplish similar production numbers on a manual line according to known prior art that is considered a market standard nine to ten employees are required. This results in significant cost savings.

Operator touch points, at which employees must act in the manufacturing process are reduced from nine to three as compared to the prior art. This reduction minimizes labor required but also reduces the potential for mistakes created by extra handling and the application of manual processes.

The high speed parallel insulated glass manufacturing line uses about one fifth the energy needed on traditional prior art production lines. According to embodiments of the invention glass is not heated nor is the airspace, saving energy. Infrared heating lamps are only turned on when needed while traditional ovens require nearly constant heating to maintain required temperatures. This leads to a large energy savings because oven heating uses five times the energy of the disclosed invention.

The elimination of temperature acclimation of insulated glass units to ambient temperature before sealing reduces the need for work in process carts and floor space required to store them. Also, this enables the desiccant in the insulated glass units to begin absorbing moisture from only the airspace of the IGU rather than losing effectiveness by absorbing ambient moisture during time that the IGU is open to the atmosphere as is common in the prior art. Ultimately this gives the desiccant present in the spacer more drying power for the airspace in the IGU creating a better resulting product.

Argon, krypton or other non-air gas is introduced at the time of assembly by embodiments of the invention, thus reducing mistakes and the likelihood of mislabeled units that may not have been properly manually filled.

According to embodiments of the invention, the fourth corner is closed and pressed by operation of the inventive machine rather than by application of a manual heat lamp and handheld stick which is a common conventional method. This leads to improvement in ergonomic safety and better quality of the finished IGU.

Glass is stored in carts vertically before and after IGU production. The vertical high speed parallel insulated glass manufacturing line provides ergonomic benefits for workers as compared to prior art manual lines because the manual lines require manually tipping glass lites to horizontal at the start then manually returning IGUs to vertical at the end of the production line. Larger insulated glass units on the prior art manual line are tipped and topped vertically, to utilize gravity to line up the edges, then tipped to horizontal for heating in the oven. The vertical line according to embodiments of the invention eliminates up to four changes in orientation of the glass between vertical and horizontal.

Aspects of the invention, including but not limited to gas filling, infrared heating, platen pressing and corner sealing prior to removal of the IGU from the manufacturing line can be utilized on traditional production lines. These improvements are not limited to high speed lines. Many of the improvements disclosed herein are beneficial for slower speed production lines as well. A standard vertical line or a manual IGU production line, for example, would benefit from the IR heating mechanism and platen press as described herein enabling the fourth corner to be closed and sealed immediately thus reducing energy wasted, improving ergonomics, reducing labor and handling of the IGUs as well as reducing the opportunity for mistakes in production.

According to another embodiment of the invention a feedback system or closed loop system is utilized to monitor temperature control of adhesive associated with spacer material at a perimeter of manufactured insulated glass unit during the manufacturing process for the manufacturing line. This is expected to facilitate adhesion between the spacer material and the lites of the insulated glass unit by monitoring adhesive material temperature and keeping adhesive material at a desired temperature or raising the temperature of adhesive material if needed to facilitate or maximize adhesion between these spacer material and the lites. Embodiments of the invention are expected to reduce concerns of seal failure and extend the life of insulated glass units manufactured with single seal spacer materials by improving seal integrity.

Briefly described, the manufacturing line includes IR lamps whose motion is controlled by servo control. The servo controlled motion of the IR lamps controls the speed of heat application on each of eight legs or each side of the insulated glass unit. For the purposes of this application eight legs exist, four on the front side and four on the back side of each insulated glass unit processed. Thus, a typical four-edged insulated glass unit is heated by eight infrared lamps, for example, eight linear focused infrared lamps.

According to an example embodiment, eight temperature sensing cameras or other temperature sensors provide feedback of the temperature of the spacer and adhesive at each leg/edge on each side of each insulated glass unit, front and back. Based on sensed temperature information for adhesive on each side of the spacer material, the system can modify the local adhesive temperature by application of a change in speed, duration or intensity of heat application by the IR lamps or other heat source to apply more heat or less heat as needed to maintain a desired adhesive temperature to facilitate proper adhesion between the spacers and lites of each IGU produced.

It has been found that variations in the environment in which the IGUs are manufactured can affect the local level of adhesion between the spacer material and the lites of the IGU. For example, drafts or air flow from ventilation systems can alter local temperatures of adhesives and/or lites. As the preheat status and/or ambient temperature of the product and the environment change the inventors have found that it is important to modify the heat applied to each portion of the spacer material accordingly to facilitate best adhesion uniformly about the edges of the insulated glass unit.

The application of closed loop feedback facilitates moderating each manufacturing cycle and it thereby expected to assist in the making more consistent quality sealed insulated glass units.

According to an example embodiment, eight linear infrared heaters are oriented and spaced to be adjustable to heat each of four edges of an IGU on both sides of the IGU substantially parallel to the edge or spacer material or adhesive. Each linear infrared heater includes at least one associated temperature sensing camera or other temperature sensor. Each focused linear infrared heating unit has a linear focus and a focal length. Each unit is positioned so that the spacer of the IGU is located proximate the focal line of the linear infrared heating unit and so that the focal line is collocated proximate with the spacer and adhesive to be heated. The temperature sensing camera or other temperature sensor is oriented to measure a temperature proximate the focal line of the heater with which it is associated and consequently proximate the adhesive of the spacer material.

Temperature data is sent to a controller which is operably coupled to the temperature sensing camera or other temperature sensor. The controller then individually controls and operates the eight linear infrared heaters based on the individual temperature inputs in order to adjust the temperature of the spacer material and its adhesive to a desired temperature to facilitate adhesion between the adhesive and the glass lites. The controller directs adjustment of the eight linear infrared heaters individually by application of a changes in speed, duration or intensity of the IR lamps or other heat source. Thus, each side of each leg of the insulated glass unit is expected to achieve desired adhesion between the space or material and the glass lights.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
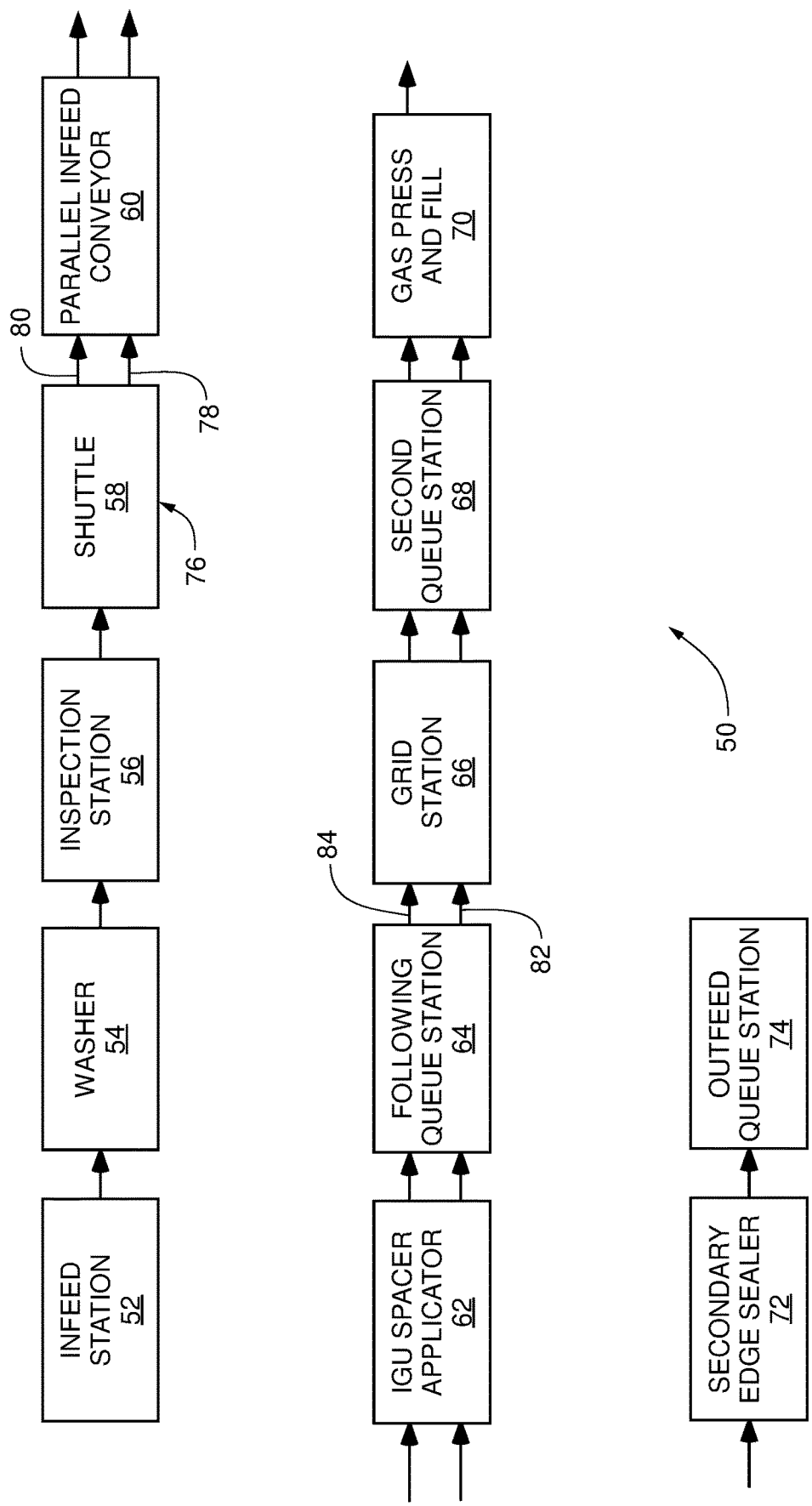
FIG. 1 is a block diagram depicting a high speed parallel process insulating glass manufacturing line according to an example embodiment of the invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIG. 1 according to an example embodiment of the invention, high speed parallel process insulating glass manufacturing line 50 generally includes infeed station 52, washer 54, inspection station 56, shuttle 58, driven parallel infeed conveyor 60, IGU spacer applicator 62, following queue station 64, driven grid station 66, second queue station 68, gas press and fill station 70, secondary edge sealer 72, and non-driven outfeed queue station 74. This example embodiment may include elements that are optional as will be discussed herein. However, the elements of the invention are to be defined by the claims appended hereto.

Infeed station 52 is generally conventional in design and known to those skilled in the art and need not be further described.

Washer 54 is general conventional in design and need not be described further herein. Washers 54 are known to those skilled in the art and are available from a number of manufacturers. Washer 54 however, is a glass lite or pane washer that operates with the lite in a generally vertical orientation.

Inspection station 56 is generally conventional in design and need not be further described herein.

Shuttle 58 according to an example embodiment of the invention includes double shuttle mechanism 76. Double shuttle mechanism 76 travels back and forth and divides incoming lites from infeed station 52, washer 54 and inspection station 56 into spacer applied lites 78 and topping lites 80. According to an example embodiment of the invention, spacer applied lites 78 are directed to front conveyor line 82 while topping lites 80 are directed to rear conveyor line 84. For the purposes of discussion of the invention, while spacer applied lite 78 and topping lite 80 may be identical or similar pieces of glass, spacer applied lite 78 refers to lites to which a perimeter spacer has been or will be applied during the manufacturing process while topping lite 80 refers to lites that will be applied on top of the spacer applied lite and perimeter spacer to create a partially assembled insulated glass unit.

Front conveyor line 82 generally transports spacer applied lites 78. Front conveyor line 82 extends generally from shuttle 58 to gas press and fill station 70. This should not be considered limiting as depending upon the exact design of high speed parallel manufacturing line 50 according to example embodiments of the invention, this extent may vary. Rear conveyor line 84 generally transports topping lites 80 and, similar to front conveyor line 82, in an example embodiment, extends generally from shuttle 58 to gas press and fill station 70.

Driven parallel infeed conveyor 60 is generally conventional in design and known to those skilled in the art and need not be further described here. Driven parallel infeed conveyor 60 includes front conveyor line 82 and rear conveyor line 84 upon which spacer applied lite 78 and topping lite 80 are conveyed.

Referring to FIGS. 2-8, IGU spacer applicator 62 generally includes applicator head 86, applicator gantry 88 and servo driven cup 90. Front conveyor line 82 upon which spacer applied lite 78 is transported is accessible to applicator head 86. Rear conveyor line 84 transports topping lites through IGU spacer applicator 62 to the rear.

Applicator head 86 is supported by applicator gantry 88 and applicator head 86, in combination with applicator gantry 88, is capable of translation in x, y and z axes. Applicator head 86 is generally also capable of rotational movement about the z axis to facilitate application of spacers to spacer applied lite 78.

Figure 4:
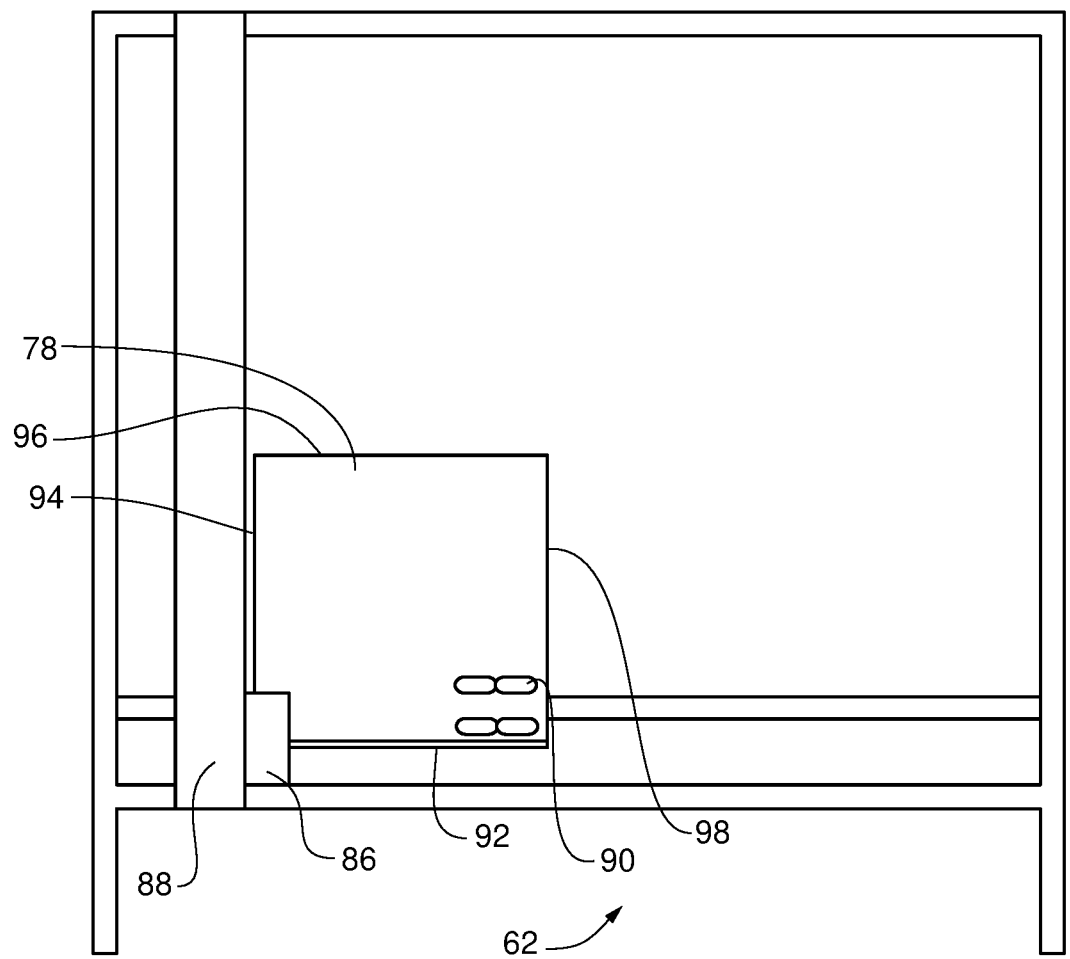
FIG. 4 is a schematic depiction of an IGU spacer applicator during spacer application to a spacer applied lite bottom edge.
Figure 5:
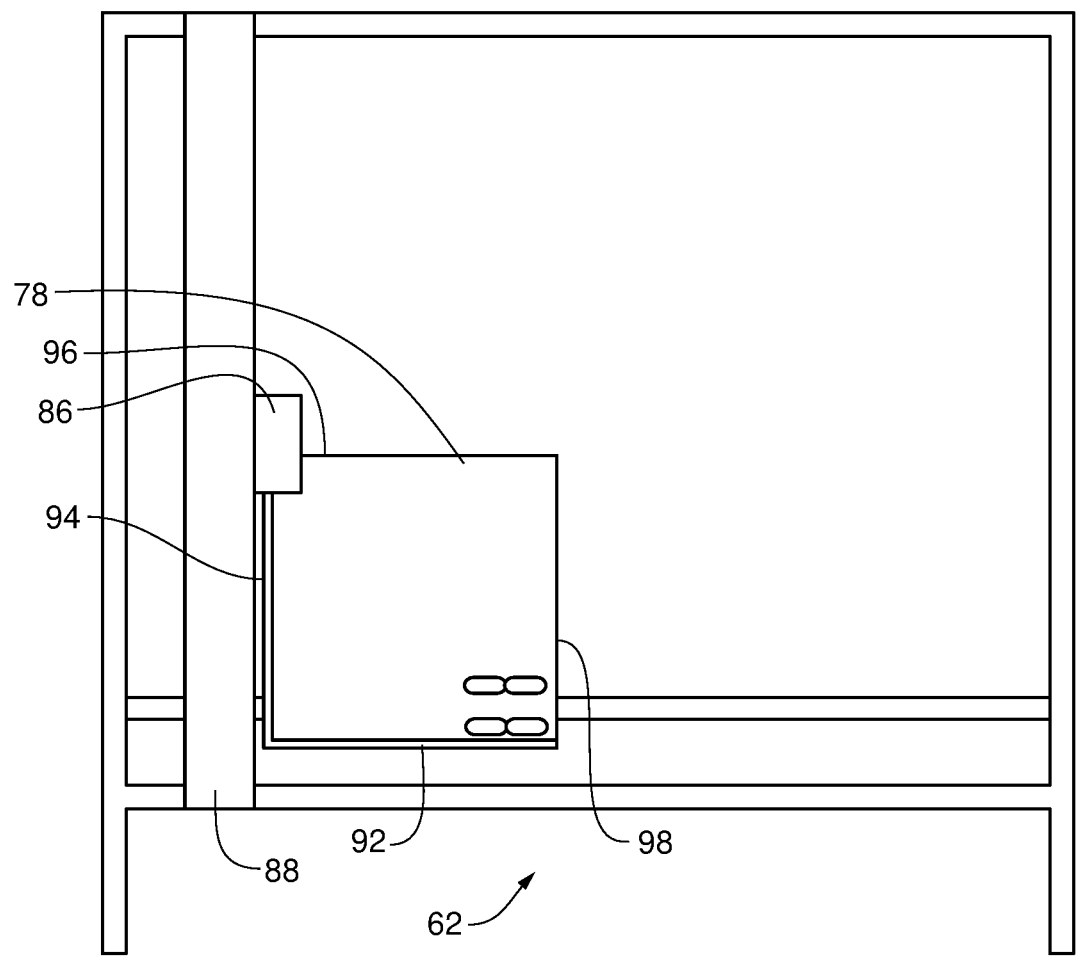
FIG. 5 is a schematic depiction of an IGU spacer applicator during spacer application to a spacer applied lite trailing edge.
Figure 6:
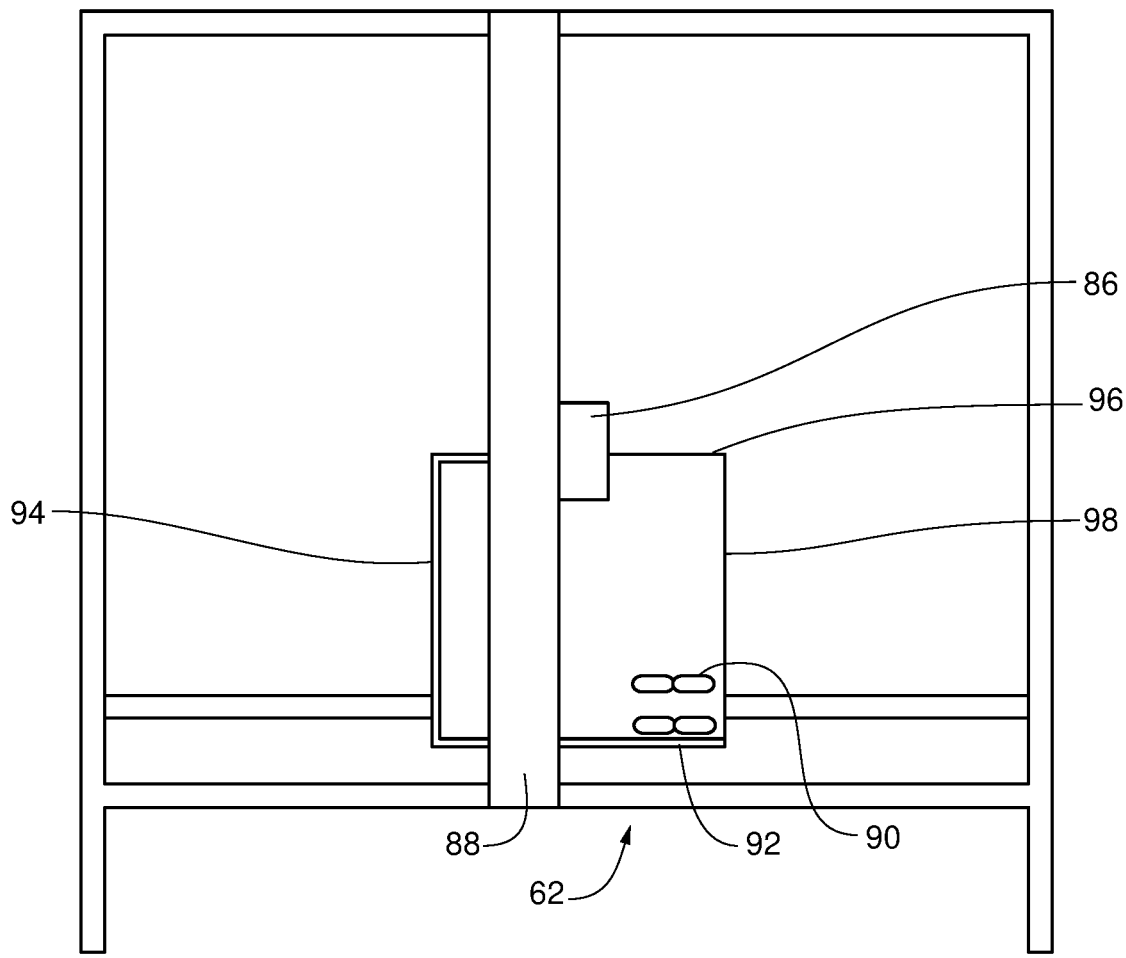
FIG. 6 is a schematic depiction of an IGU spacer applicator beginning spacer application to a spacer applied lite top edge.
Figure 7:
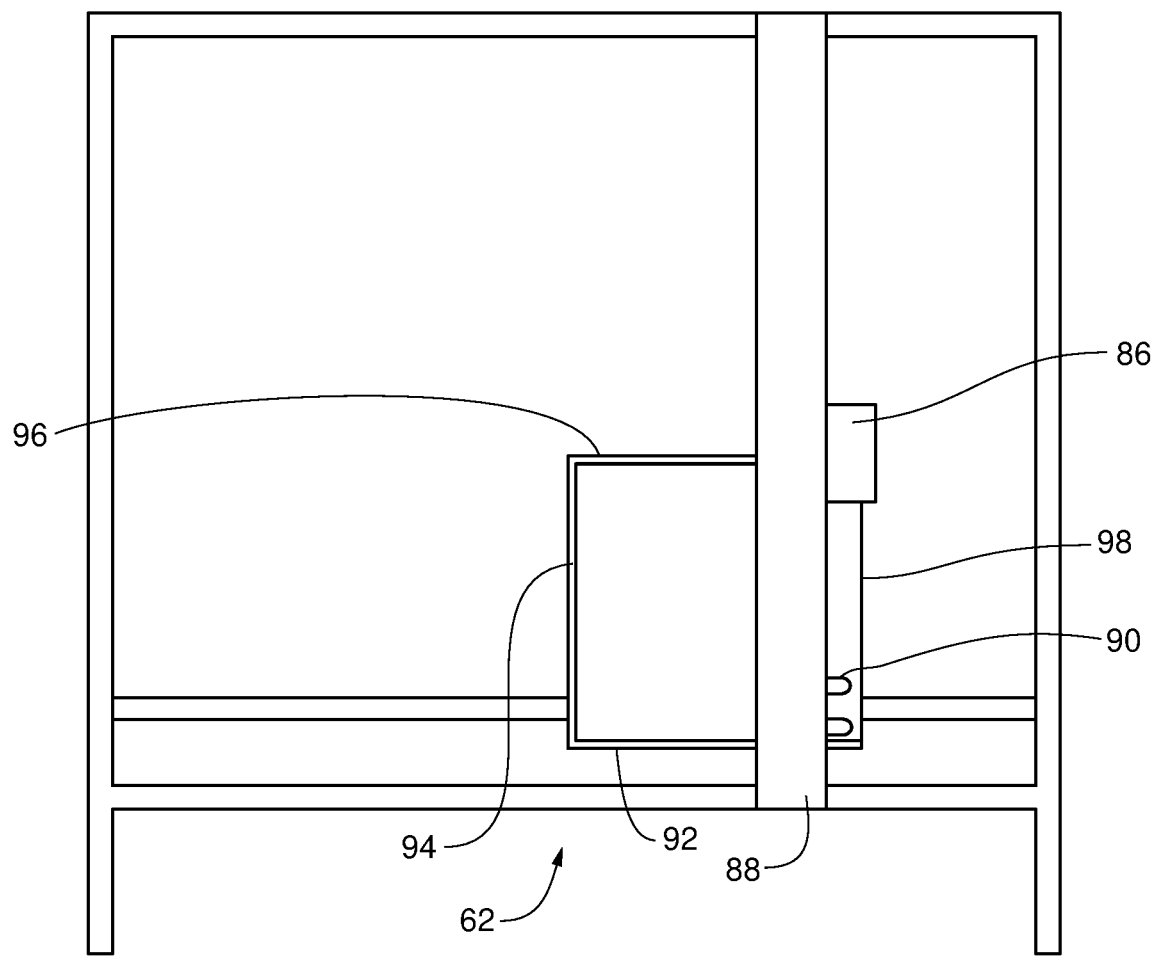
FIG. 7 is a schematic depiction of an IGU spacer applicator continuing spacer application to a spacer applied lite top edge.
Figure 8:
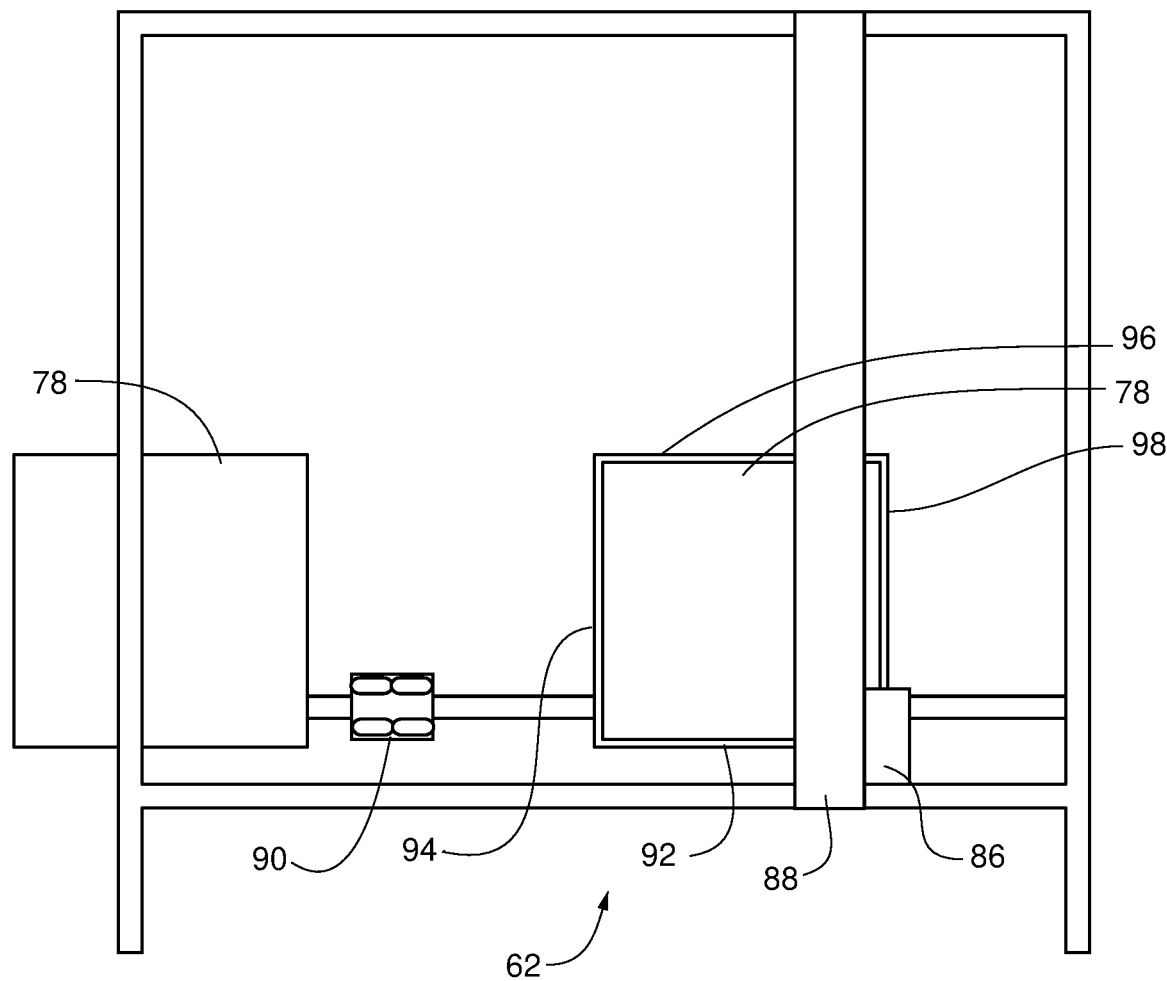
FIG. 8 is a schematic depiction of an IGU spacer applicator during spacer application to a spacer applied lite leading edge.
Figure 9:
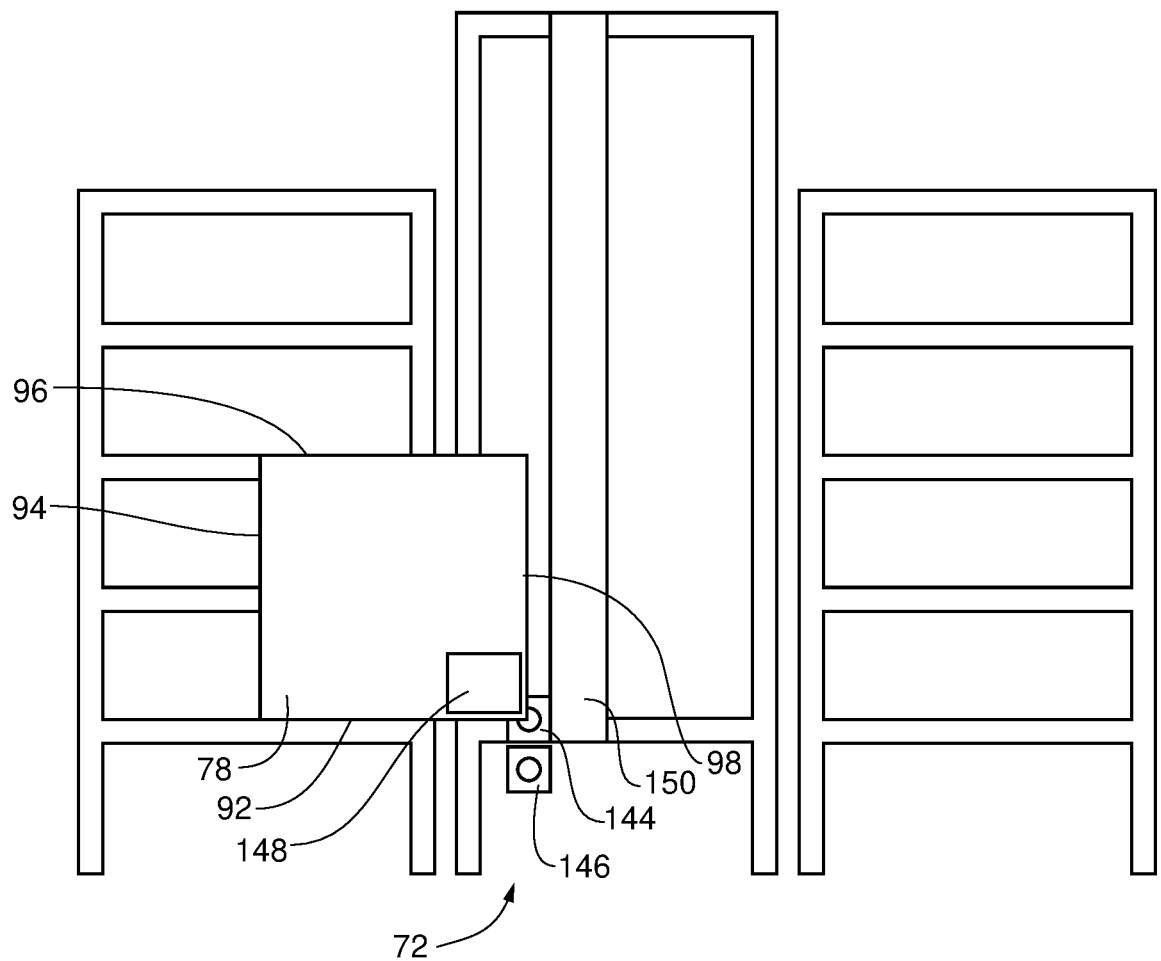
FIG. 9 is a schematic depiction of a dual head IGU secondary sealer at the initiation of an IGU sealing sequence.
Figure 10:
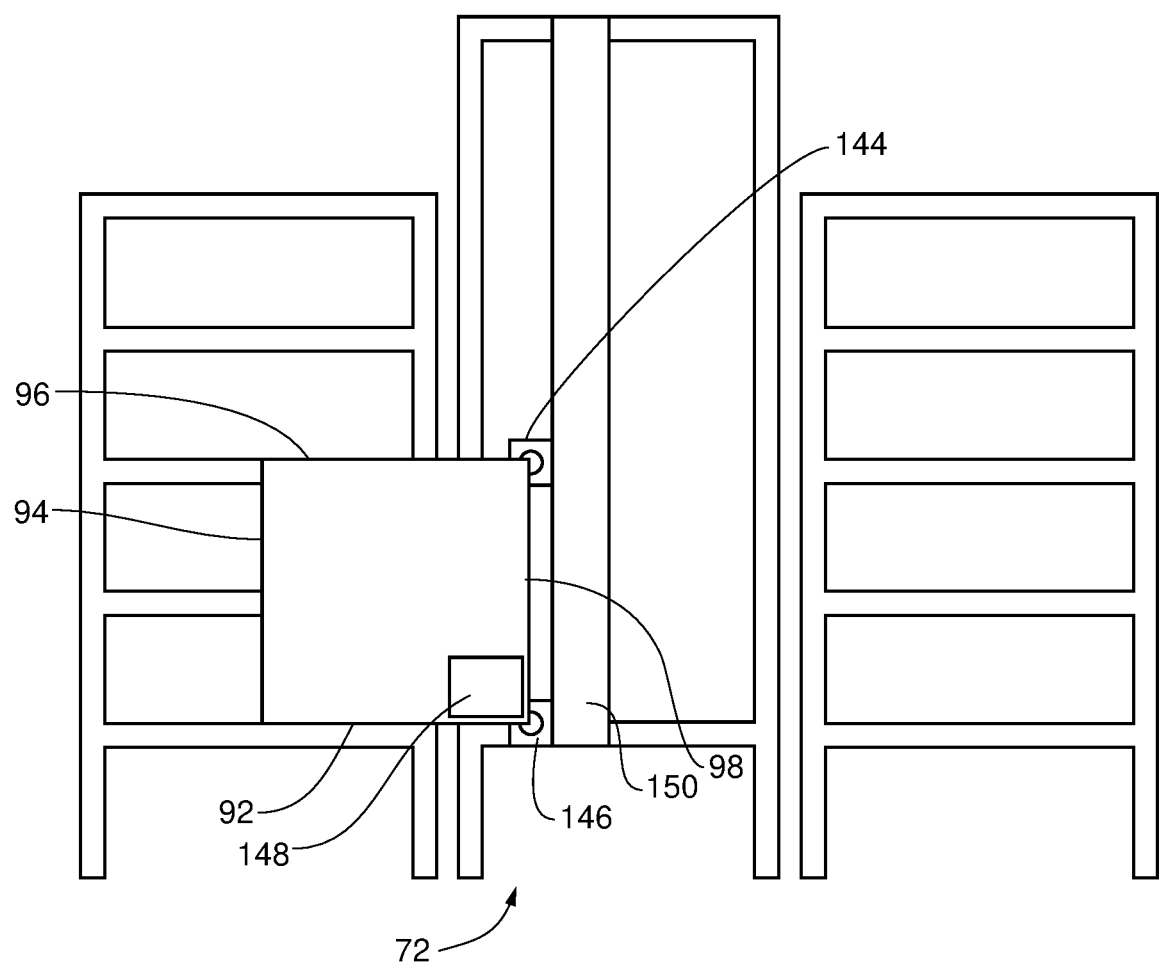
FIG. 10 is a schematic depiction of a dual head IGU secondary sealer as a first sealing head applies secondary sealant to a leading edge of an insulated glass unit and a second sealing head engages the bottom edge of the insulated glass unit.
Figure 11:
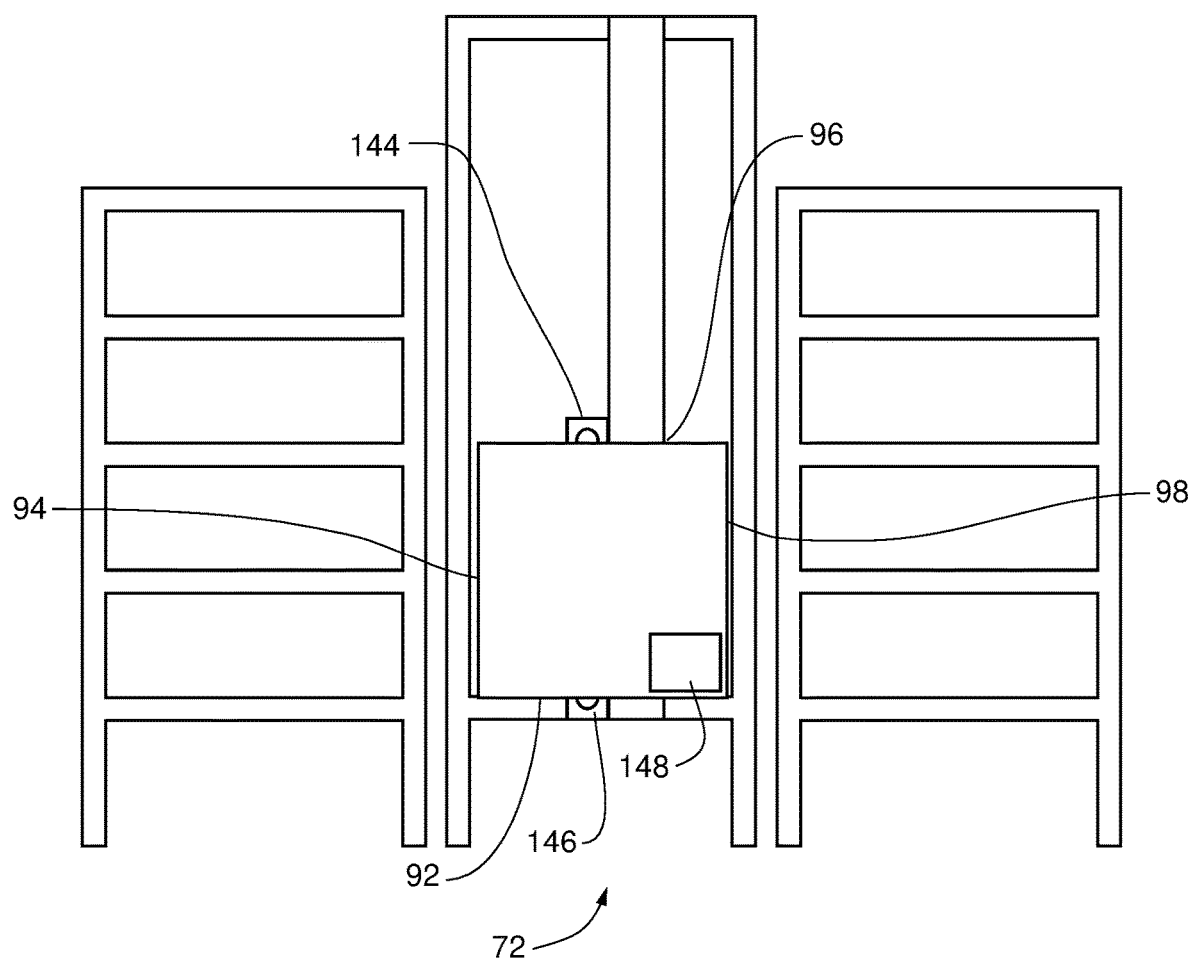
FIG. 11 is a schematic depiction of a dual head IGU secondary sealer as a first sealing head applies secondary sealant to a top edge of an insulated glass unit and a second sealing head applies sealant to the bottom edge of the insulated glass unit.
Figure 12:
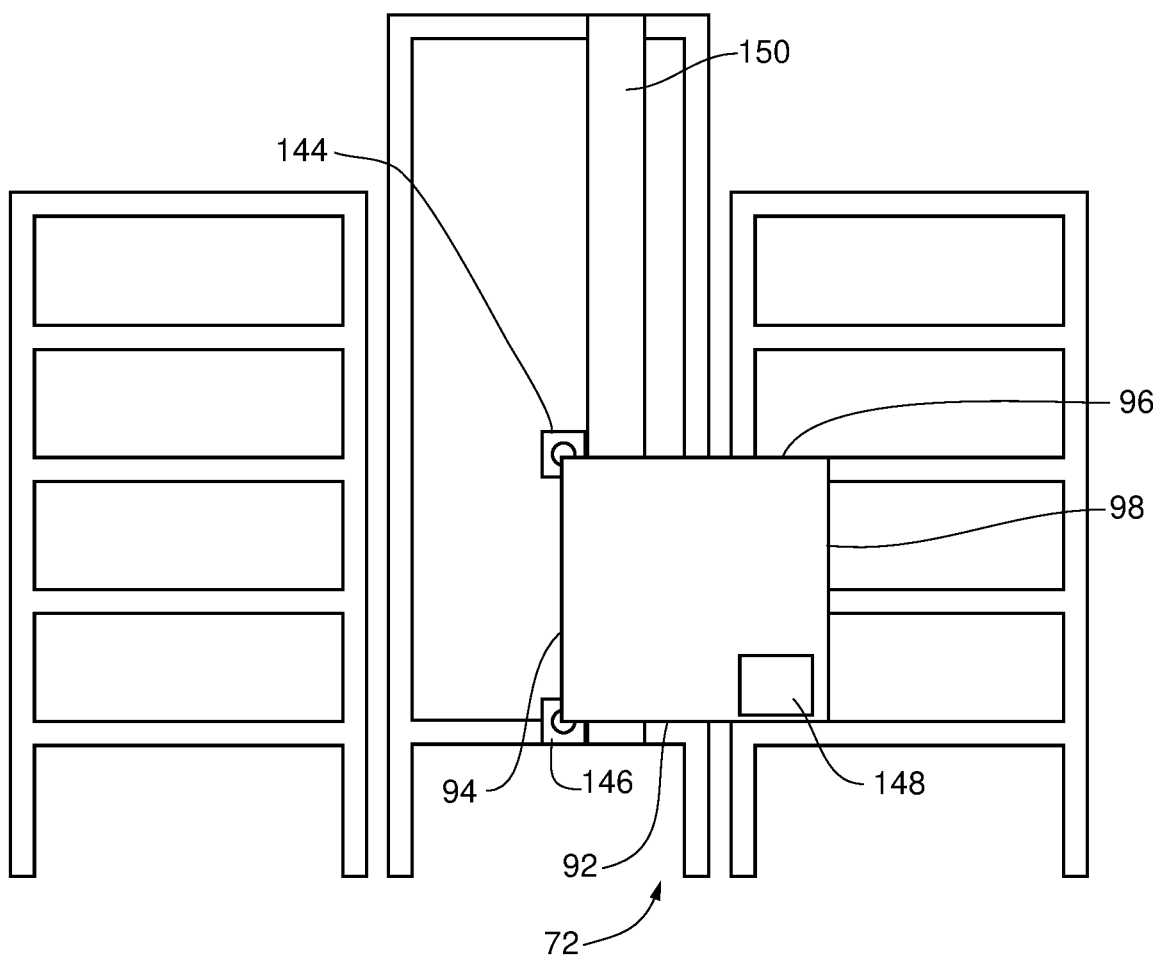
FIG. 12 is a schematic depiction of a dual head IGU secondary sealer as the first sealing head completes application of secondary sealant to a top edge of an insulated glass unit and the second sealing head completes application of sealant to the bottom edge of the insulated glass unit.
Figure 13:
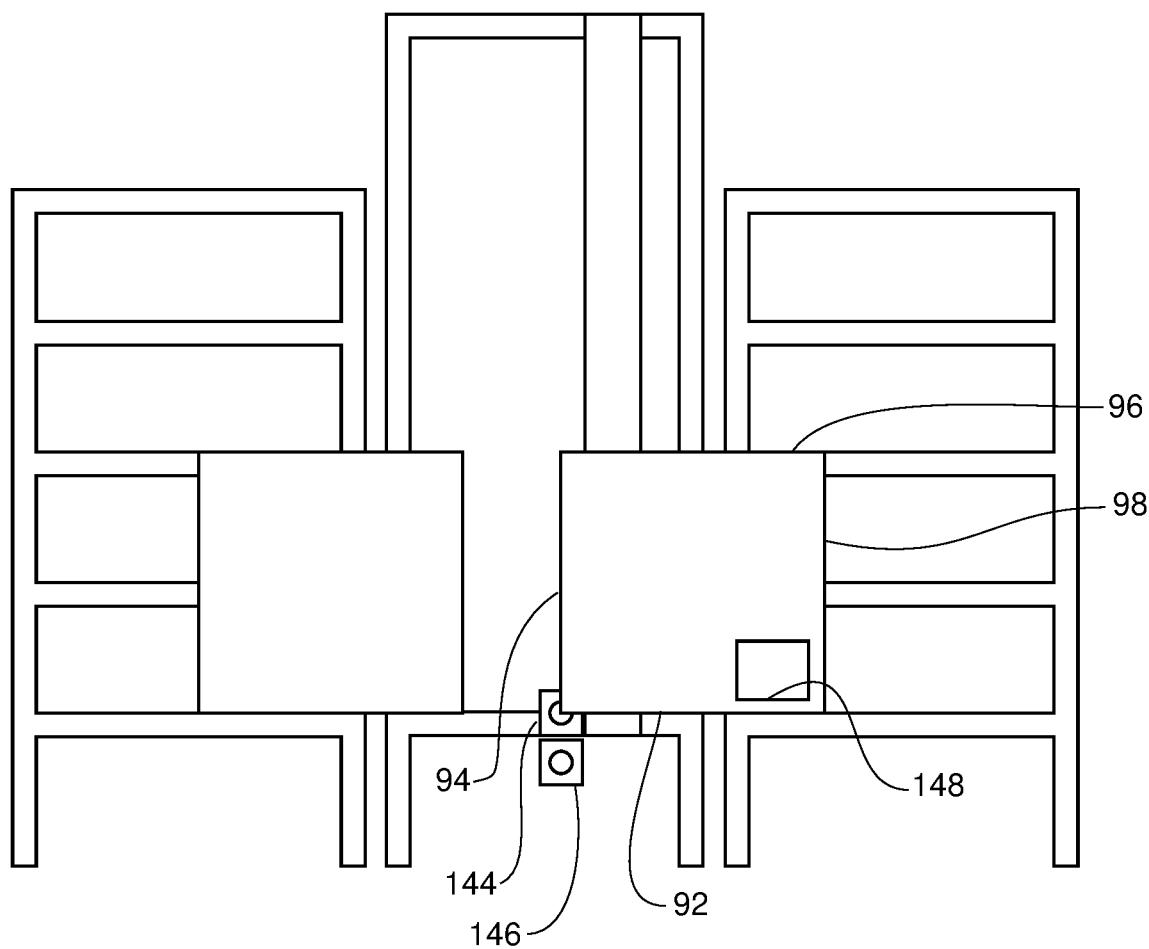
FIG. 13 is a schematic depiction of a dual head IGU secondary sealer as the first sealing head applies secondary sealant to a trailing edge of an insulated glass unit and a second sealing head disengages from the bottom edge of the insulated glass unit.

Servo driven cup 90 supports suction cups configured to selectively grip spacer applied lite 78. Such suction cups are generally conventional and need not be further described here to those of ordinary skill in the art. As best seen in FIG. 4, servo driven cup 90 is configured to grip spacer applied lite 78 and advance it slightly prior to the beginning of application to permit the staging of a following spacer applied lite 78 while a perimeter spacer is applied to the leading spacer applied lite 78.

IGU spacer applicator 62 generally also includes vertical support 104 in addition to front conveyor 100 and rear conveyor 102.

Referring particularly to FIGS. 3-8, according to an example embodiment of the invention, spacer is applied while spacer applied lite 78 is moving forward. Thus, applicator head 86 and applicator gantry 88 are configured to follow spacer applied lite 78 as it is conveyed forward and to apply spacer while spacer applied lite 78 is being conveyed forward.

According to an example embodiment of the invention, movement of applicator head 86, applicator gantry 88 and servo driven cup 90 are coordinated with each other so that spacer is applied first to bottom edge 92 of spacer applied lite 78 followed by trailing edge 94 of spacer applied lite 78 then top edge 96 and leading edge 98 in sequence while spacer applied lite 78 travels forward. Accordingly, applicator head 86 first travels backward relative to the motion of spacer applied lite 78 to apply spacer bottom edge 92 of spacer then upward to apply spacer to trailing edge 94 then forward relative to spacer applied lite 78 to apply spacer to top edge 96. Applicator head 86 then travels downward along leading edge 96 to complete spacer application around the perimeter of spacer applied lite 78. All the while spacer applied lite 78 travels forward on the assembly line.

According to an example embodiment of the invention, applicator head 86 then rotates in a clockwise direction while returning to apply spacer to a following spacer applied lite 78.

Driven grid station 66 is generally conventional in design and includes grid applicator 106. Driven grid station 66 is generally conventional in design and need not be further described here.

Gas press and fill station 70 according to example embodiments of the invention may include double gas press 108 or single gas press 110.

Figure 14:
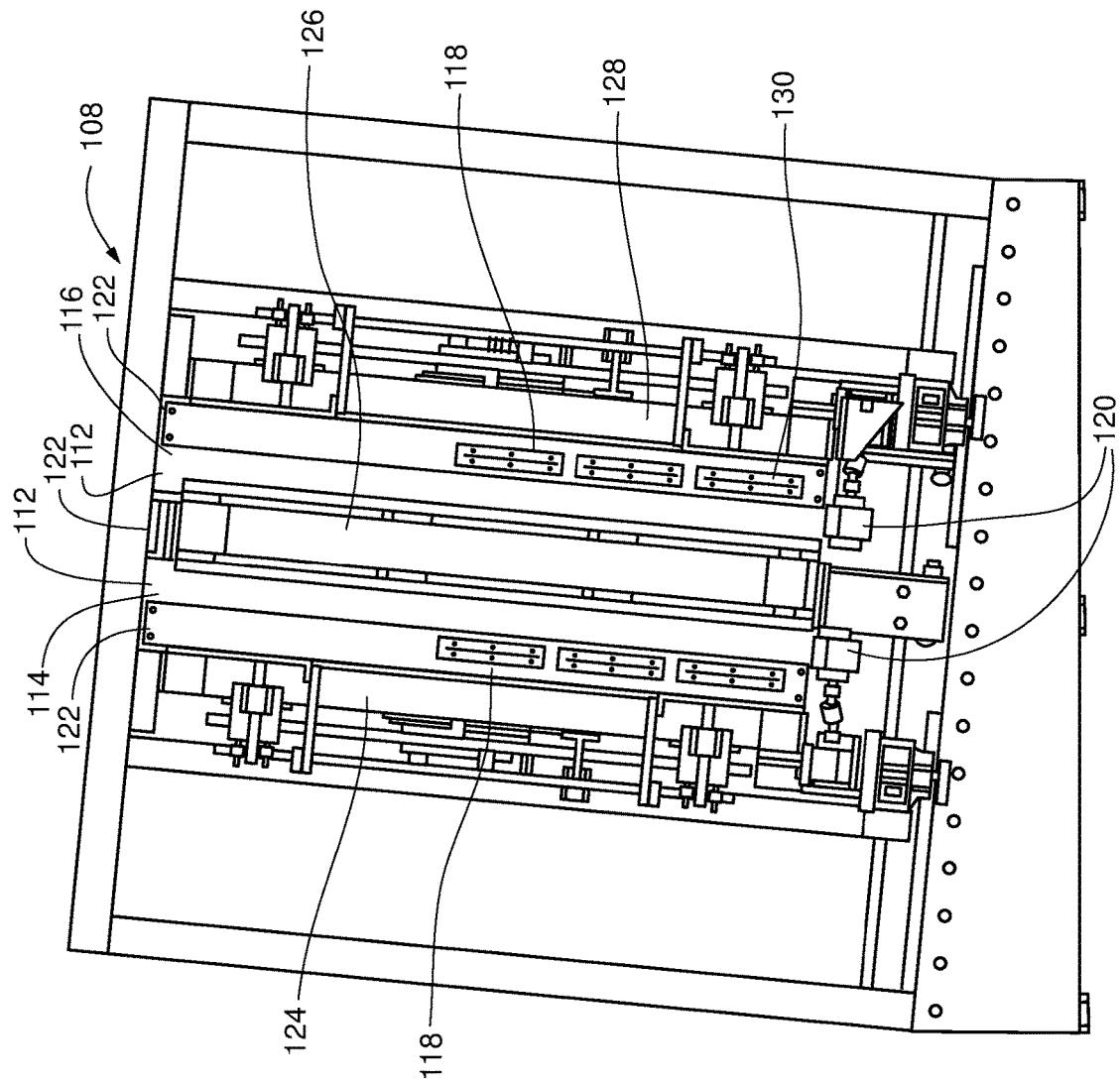
FIG. 14 is an elevational view of a double gas press according to an embodiment of the invention.

According to an example embodiment, depicted in FIG. 14, double gas press 108 includes two gas press compartments 112 including front gas press compartment 114 and rear gas press compartment 116. Each of front gas press compartment 114 and rear gas press compartment 116 include gas ducts 118 and internal conveyor 120.

Double gas press 108 generally includes three platens 122. Platens 122 include front platen 124, central platen 126 and back platen 128. Each of the three platens 122 includes suction grippers (not depicted) on at least one surface thereof. According to an example embodiment of the invention, front platen 124 includes suction grippers (not depicted) on one surface thereof while central platen 126 includes suction grippers on two surfaces thereof and back platen 128 includes suction grippers on one surface thereof.

Double gas press 108 includes gas supply 130 as well. Front gas press compartment 114 and rear gas press compartment 116 are configured to open and close to accept spacer applied lites 78 and topping lites 80. Double gas press 108 is configured so that front gas press compartment 114 and rear gas press compartment 116 shuttle back and forth to align with front conveyor 100 and rear conveyor 102.

Front platen 124 is configured to be movable back and forth relative to central platen 126 to open and close front gas compartment 114 while also bringing spacer applied lite 78 into close proximity to topping lite 80 for mating. Rear gas press compartment 116 is configured so that back platen 128 and central platen 126 may be moved relative to each other in a similar fashion.

Figure 15:
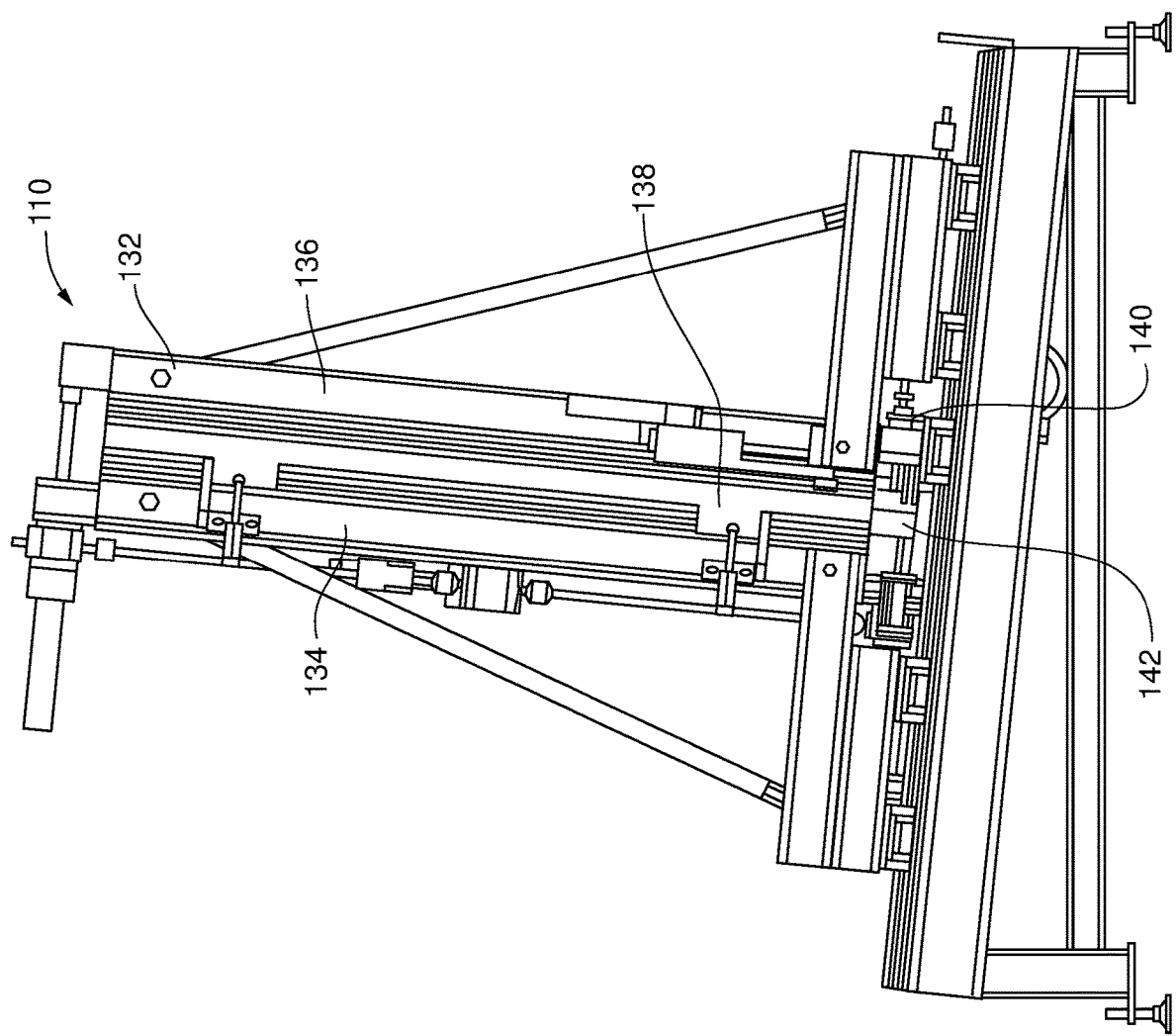
FIG. 15 is an elevational view of a single gas press according to an embodiment of the invention.

According to another example embodiment depicted in FIG. 15, single gas press 110 generally includes housing 132 enclosing front platen 134 and back platen 136. Housing 132 further includes side doors 138, internal conveyor 140 and gas ducts 142. Single gas press 110 is structured to travel or shuttle forward and back between front conveyor 100 and rear conveyor 102. Front platen 134 is movable relative to back platen 136. Gas ducts 142 may be located below, at the leading edge or at the trailing edge of single gas press 110. Side doors 138 are configured to open and close to contain gas therein and exclude atmospheric gas during the gas filling process.

If gas ducts 142 are located below the location at which spacer applied lites 78 are received, gas ducts may be configured to withdraw and advance while internal conveyor 140 is withdrawn and advanced to permit gas filling. For example, gas ducts 142 and internal conveyor 140 can be mutually coupled and movable perpendicular to their long axis.

Referring to FIGS. 9-13, according to an example embodiment, secondary edge sealer 72 generally includes first edge sealing head 144, second edge sealing head 146, servo driven cup 148, and gantry 150.

According to an example embodiment of the invention, first edge sealing head 144 is supported by gantry 150. Second edge sealing head 146 is separately located at a lower edge of where insulated gas units that have been gas filled and pressed pass through secondary edge sealer 72. According to an example embodiment of the invention, first edge sealing head 144 travels on gantry 140 to apply secondary edge sealant to leading edge 98, top edge 96 and trailing edge 94 of insulated glass units. Second edge sealing head 146 applies secondary edge sealant to bottom edge 92 of insulated glass units. According to an example embodiment of the invention, servo driven cups 148 grip and transport the insulated glass unit forward. It is notable that according to the present invention, insulated glass units never travel backwards on the conveyor line but always move forward. This is also true of spacer applied lites 78 as spacers are applied to them. Servo driven cups 148 are configured to displace the insulated glass unit forward to permit staging of a following insulated glass unit 78 while the first unit is being edge sealed.

According to an example embodiment of the invention, each of the first edge sealing heads 144 and lower second edge sealing heads 146 includes first corner wiper 152 and second corner wiper 154 that eliminate or minimize the need for operator touch-up of insulated glass units. First corner wiper 152 is coupled to first edge sealing head 144 while second corner wiper 154 is coupled to second edge sealing head 146.

Having been secondary edge sealed the insulated glass unit is conveyed from secondary edge sealer 72 to non-driven outfeed queue station 74.

Non-driven outfeed queue station 74 is generally conventional in design and need not be further described here.

According to another embodiment of the invention, the invention includes a method of manufacturing insulated glass units. According to an embodiment of the invention, the method includes receiving glass lites at infeed station 52; conveying the glass lites to washer 54; washing and drying the glass lites in washer 54; conveying the glass lites to an inspection station 56 and further conveying the glass lites to shuttle 58. The method may include shuttling alternate lites to front conveyor line 82 and rear conveyor line 84 and shuttle 58 and distributing spacer applied lites 78 to front conveyor line 82 and distributing topping lites 80 to rear conveyor line 84. The method may then include conveying spacer applied lites 78 and topping lite 80 through infeed conveyor 60 to IGU spacer applicator 62.

The method may further include applying IGU spacer to spacer applied lite 78 while spacer applied lite 78 is constantly moving forward or at least never being moved backward. The method may further include applying spacer to spacer applied lite 78 first, along bottom edge 92, second, along trailing edge 94, third, along top edge 96 and fourth, along leading edge 98. The method further includes conveying spacer applied lite 78 from IGU spacer applicator 62 to following queue station 64.

The method also includes optionally applying grids at driven grid station 66.

According to another embodiment, the method includes conveying spacer applied lite 78 and topping lite 80 via second queue station 68 to gas press and fill station 70.

According to one embodiment of the invention, the method further includes gas filling and applying topping lite 80 to spacer applied lite 78 in double gas press 108.

The method further includes in another embodiment applying topping lite 80 to spacer applied lite 78 and gas filling in single gas press 110.

A method according to an embodiment of the invention includes mating topping lite 80 with spacer applied lite 78 in a double gas press. In this embodiment of the invention, alternate insulated glass units are assembled in a front gas compartment 114 and a rear gas compartment 116 of double gas press 108.

According to another embodiment of the invention, the method further includes mating topping lite 80 with spacer applied lite 78 and gas filling in single gas press 110.

According to another embodiment of the invention, the method further includes conveying an insulated glass unit from double gas press 108 or single gas press 110 to secondary edge sealer 72. The method further includes secondary edge sealing of the insulated glass unit by first edge sealing head 144 and second edge sealing head 146. The method further includes sealing in sequence leading edge 98, top edge 96, and trailing edge 94 of the insulated glass unit with first edge sealing head 144 while simultaneously sealing bottom edge 92 with second edge sealing head 146. The method according to the invention further includes conveying the insulated glass unit with servo driven cup 148 during the edge sealing process. The method may further include secondary edge sealing the insulated glass unit while continuously moving the insulated glass unit forward in the conveying process.

Referring to FIGS. 16-24, another embodiment of high speed parallel manufacturing line 50 is depicted.

Figure 16:
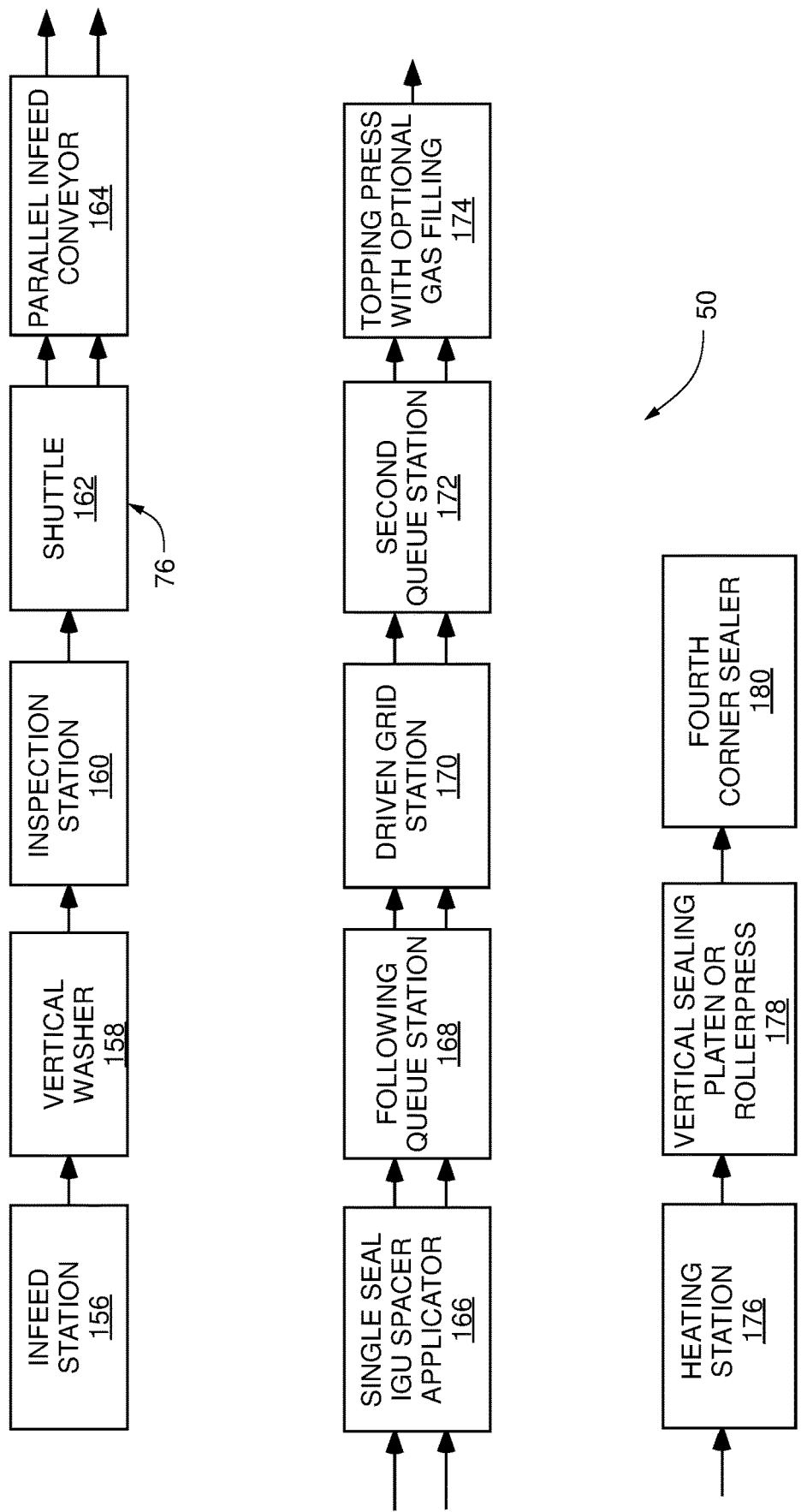
FIG. 16 is a block diagram depicting a high speed parallel process insulating glass manufacturing line with gas filling according to another example embodiment of the invention.

Referring to FIG. 16, the depicted embodiment generally includes infeed station 156, vertical washer 158, inspection station 160, shuttle 162, driven parallel infeed conveyor 164, single seal IGU spacer applicator 166, following queue station 168, driven grid station 170, second queue station 172, press and seal unit 174, heating station 176, vertical press 178, and fourth corner sealer 180.

Infeed station 156 is generally conventional in design and similar to that described above.

Vertical washer 158 is generally conventional in design and similar to that described above.

Inspection station 160 is generally conventional in design and similar to that described above.

Shuttle 162 is similar to that described above.

Driven parallel infeed conveyor 164 is similar to that described above.

Figure 2:
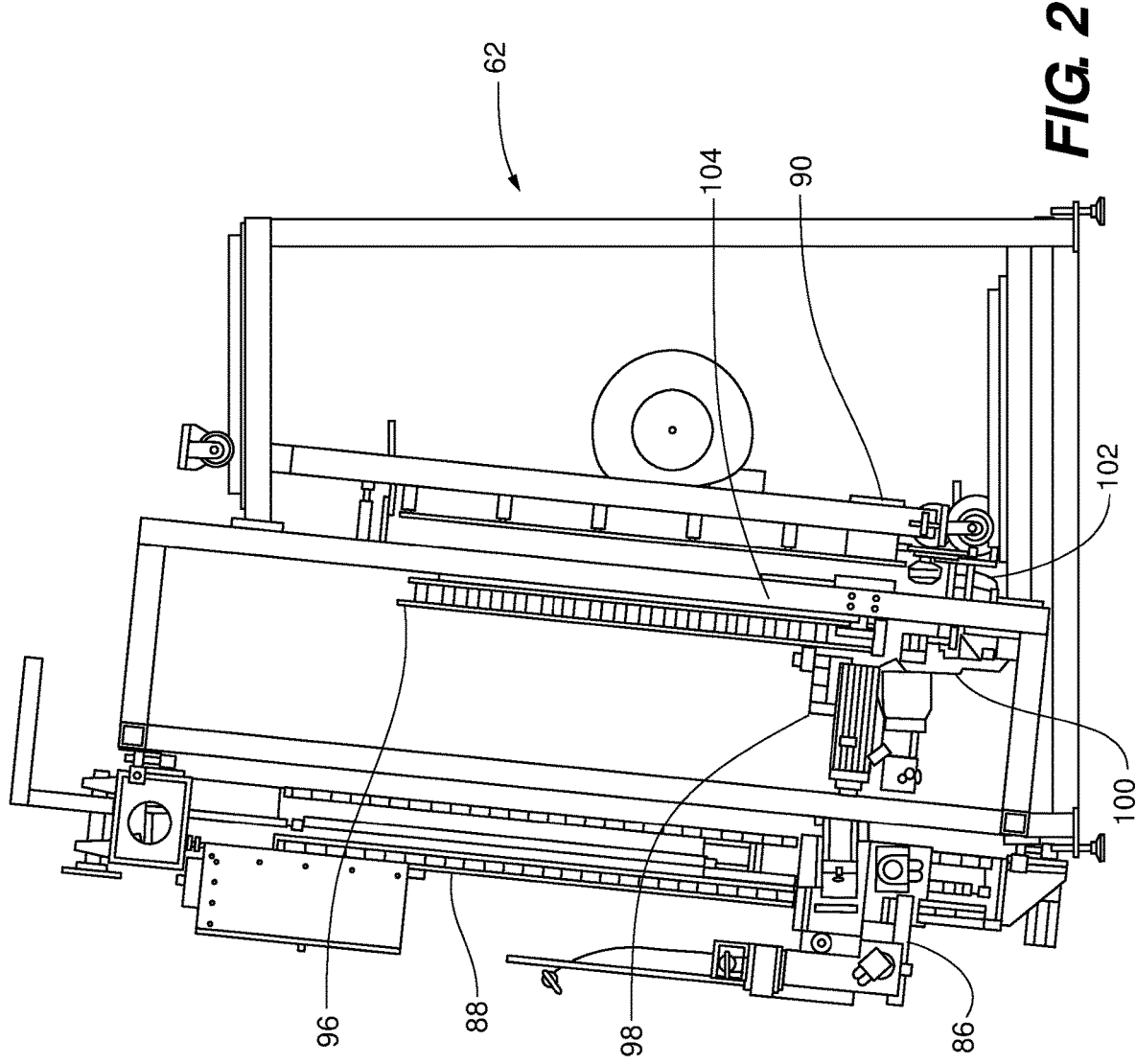
FIG. 2 is an end elevational view of an IGU spacer applicator according to an example embodiment of the invention.
Figure 3:
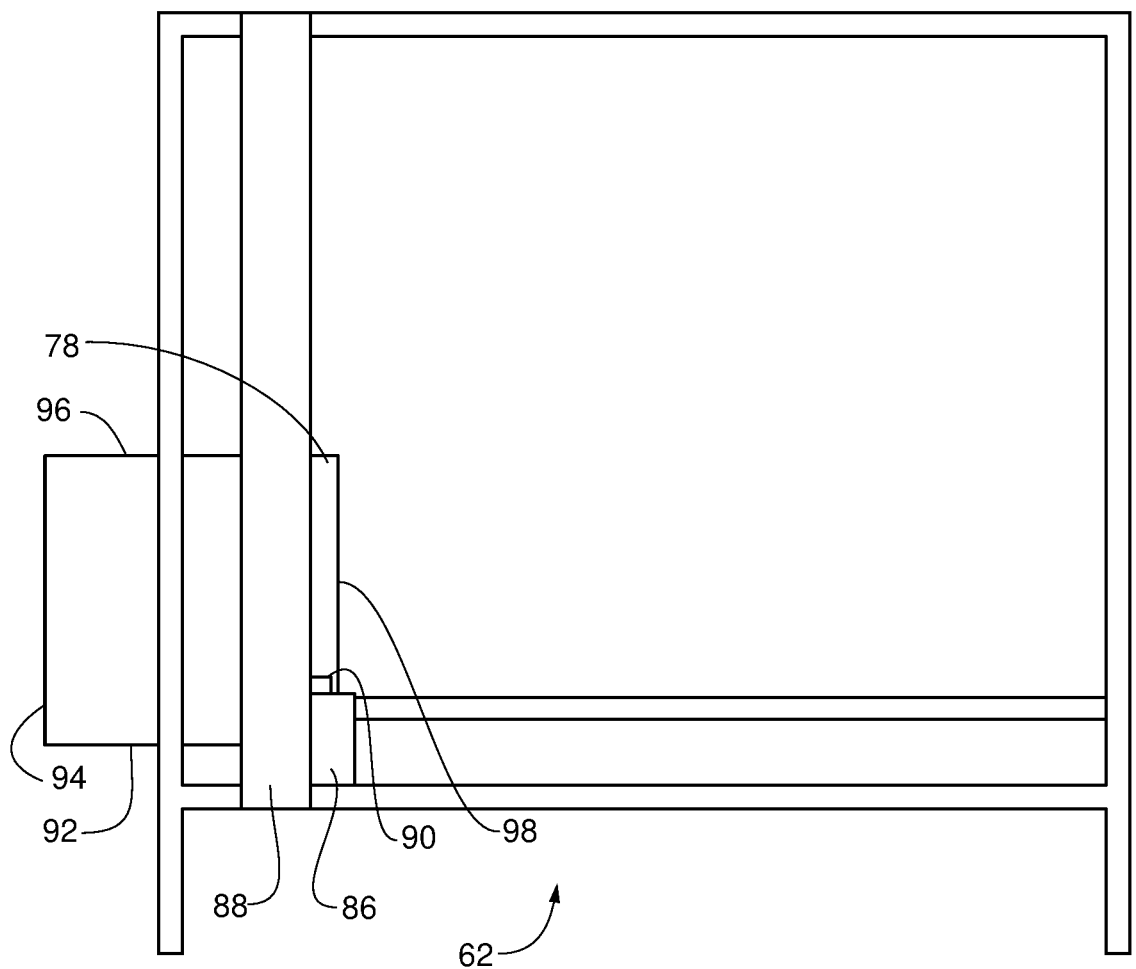
FIG. 3 is a schematic depiction of an IGU spacer applicator at the beginning of spacer application to a spacer applied lite.

Single seal IGU spacer applicator 166 is adapted to apply single seal spacer products. Single seal spacer products are utilized without the need to apply a secondary seal and without a need for corner notching as the single seal spacer products are flexible enough to be applied at corners of the IGU by bending the single seal spacer product. Referring to FIG. 2, single seal IGU spacer applicator 166 includes heated spacer drum 182 for storage of spacer material. The motion and structure of single seal IGU spacer applicator 166 is similar to that described above with relation to applicator head 86, applicator gantry 88 and servo driven cup 90. Single seal IGU spacer applicator 166 is constructed and adapted so that when spacer material is applied, a fourth corner of the insulated glass unit is left slightly open to ambient air.

Following queue station 168 is generally conventional and similar to that described above.

Driven grid station 170 is generally conventional and similar to that described above.

Second queue station 172 is generally conventional and similar to that described above.

Figure 20A:
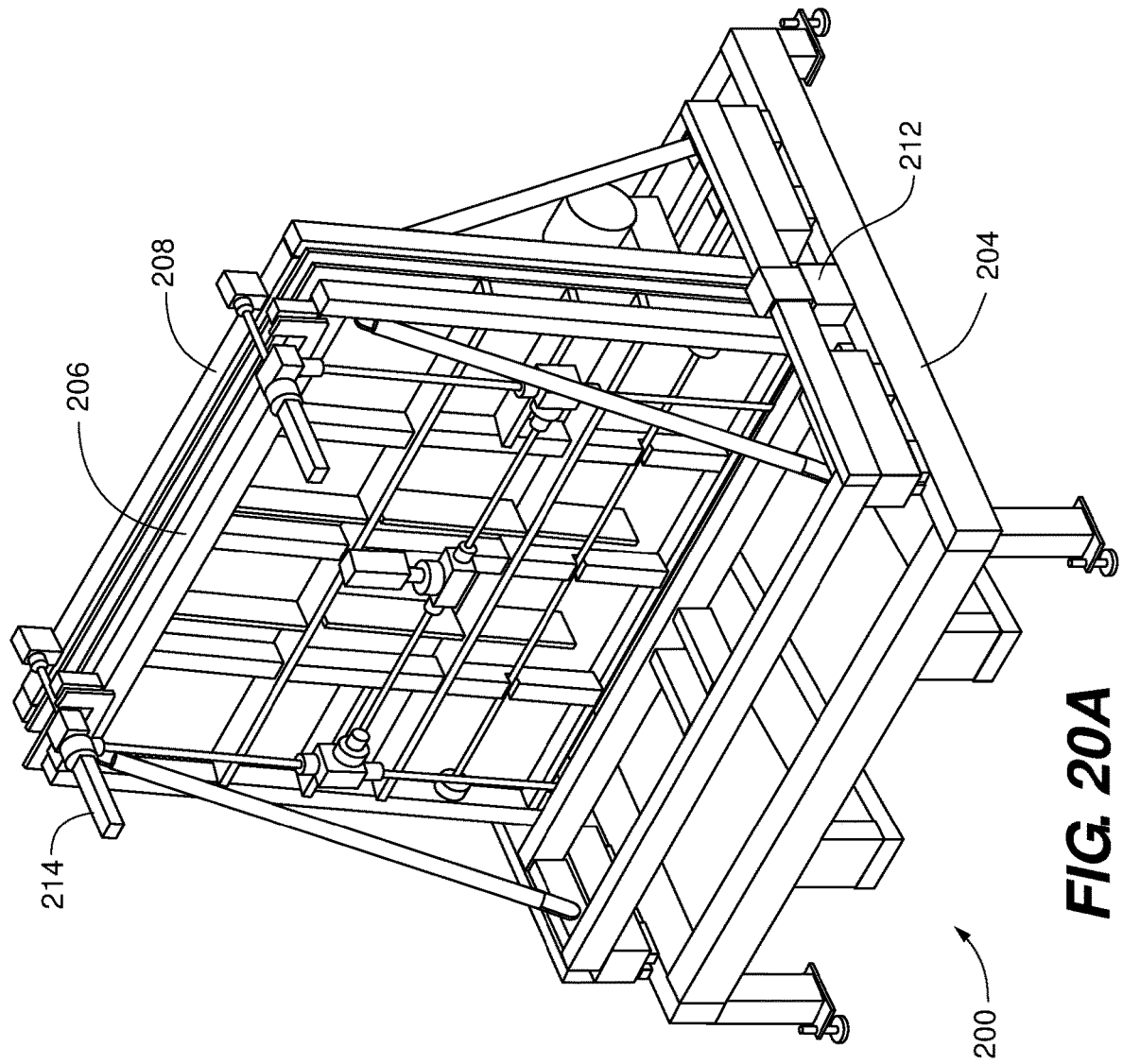
FIG. 20A is a perspective view of a vertical sealing platen press according to an example embodiment of the invention.
Figure 20B:
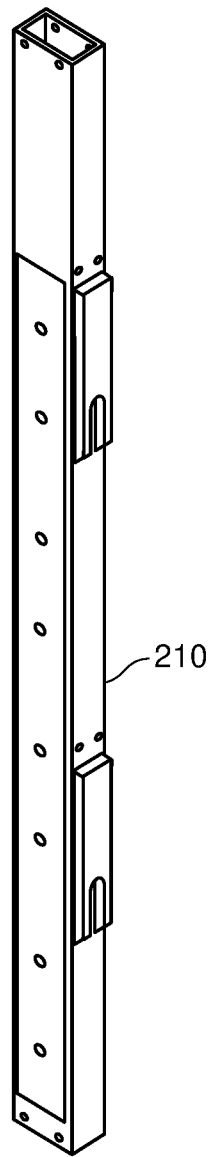
FIG. 20B is a perspective view of a gas fill manifold assembly according to an example embodiment of the invention.
Figure 25:
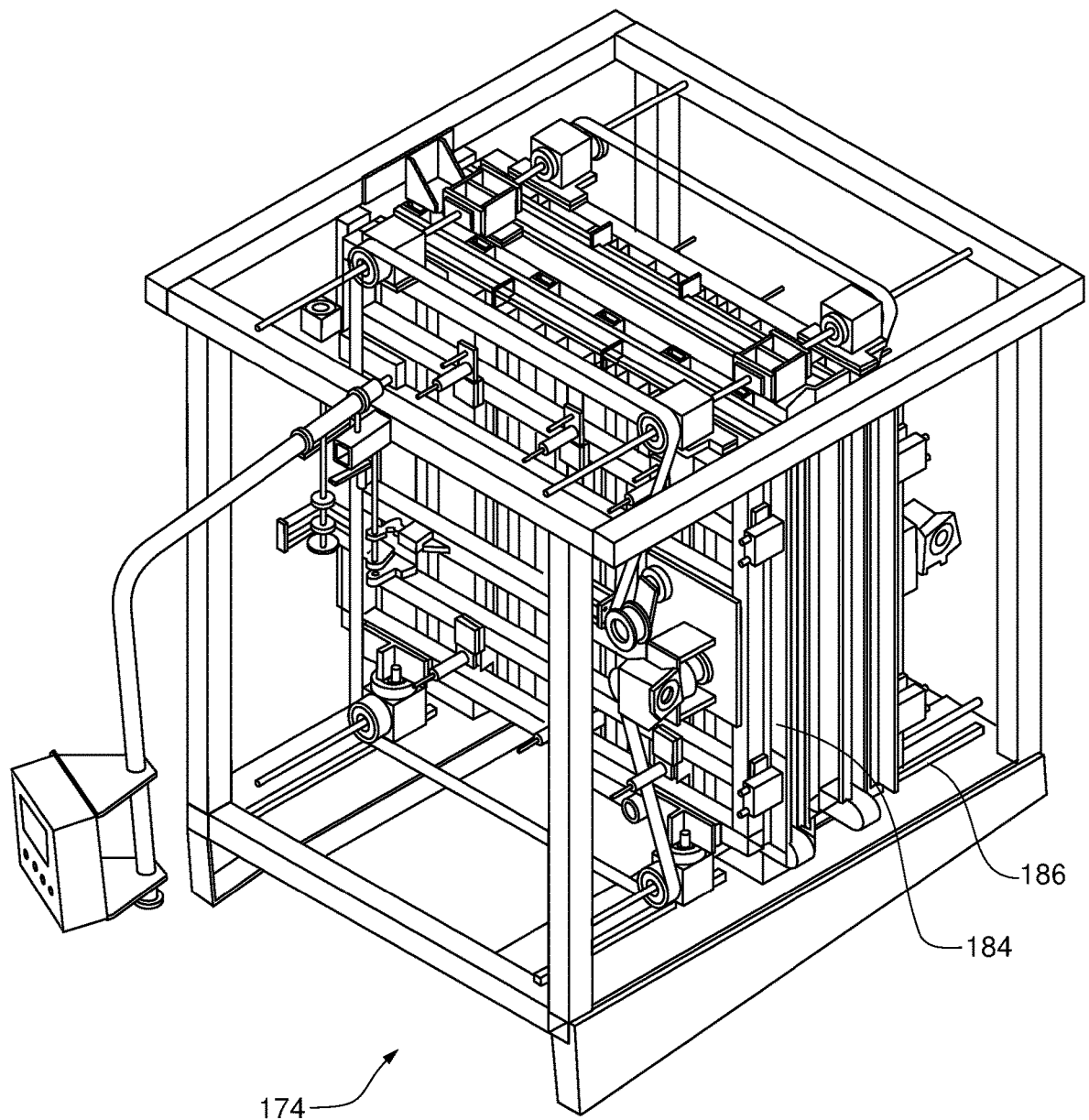
FIG. 25 is a perspective view of an auto-topping press according to an example embodiment of the invention.

Referring to FIGS. 20B and 25, press and seal unit 174 may include auto topping press with gas fill 184 and infeed shuttle 186. Auto topping press may also include gas fill manifold assembly 187.

Figure 17:
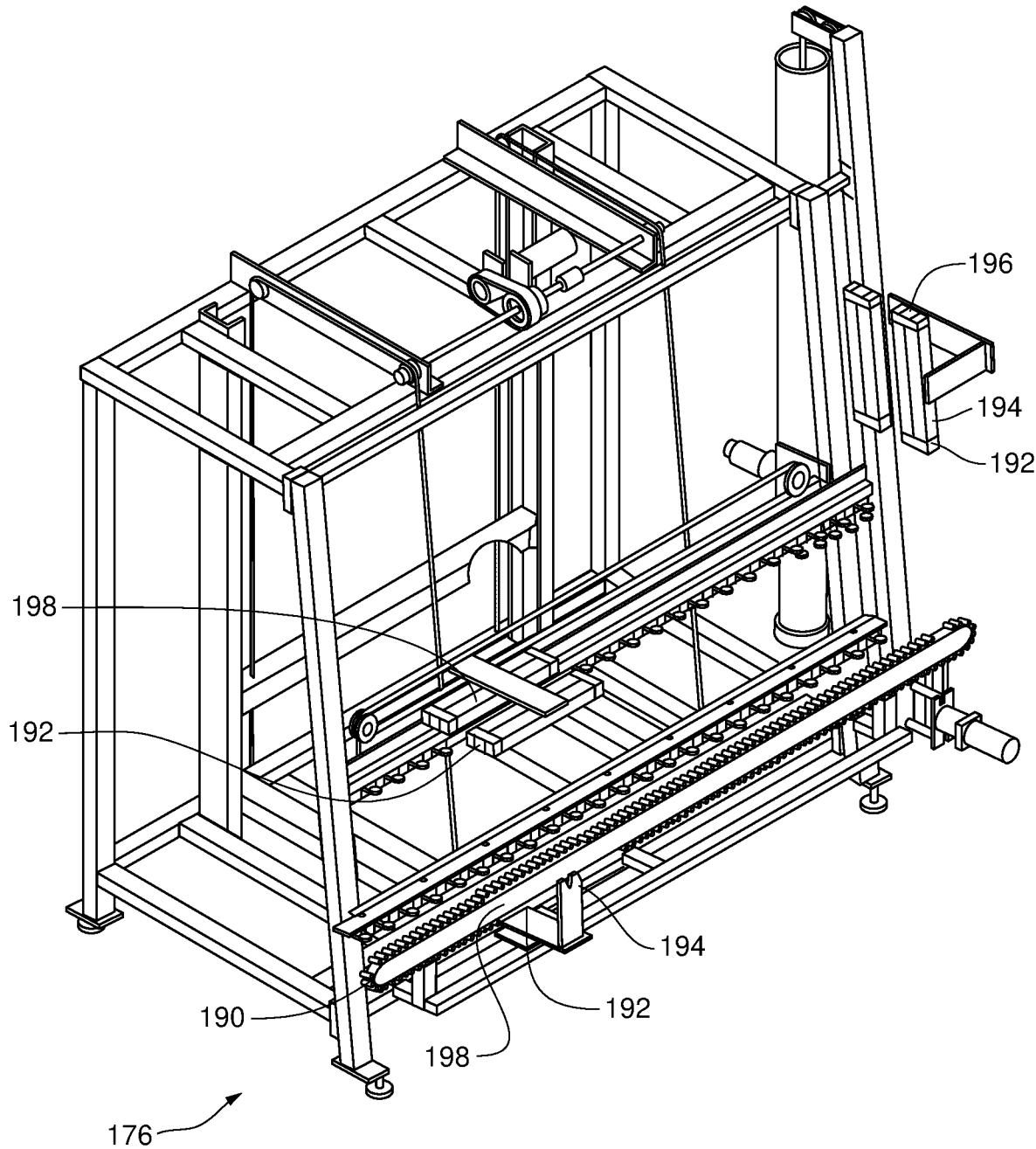
FIG. 17 is a front elevational view of a heating station according to an example embodiment.
Figure 18:
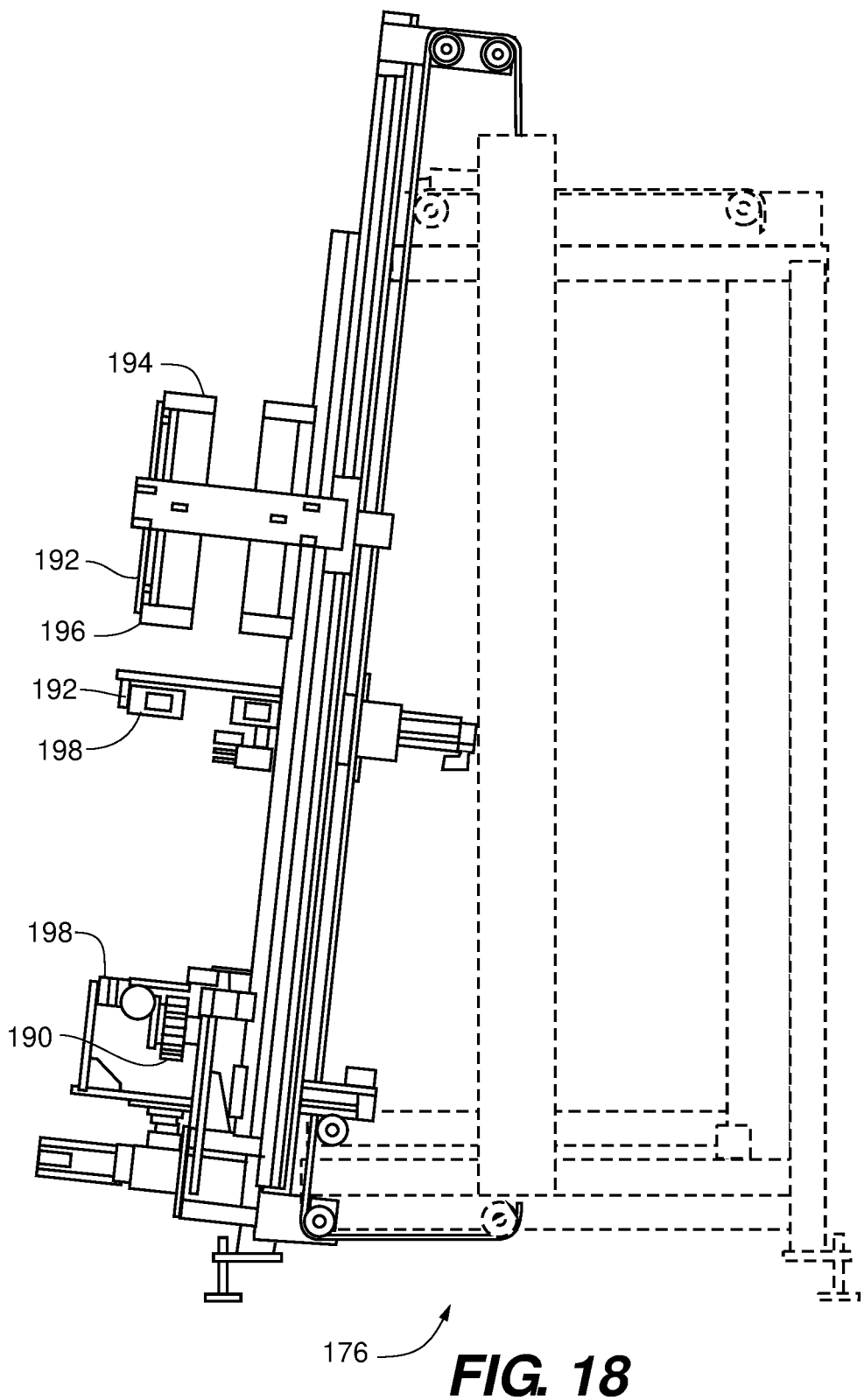
FIG. 18 is a side elevational view of the heating station of FIG. 17.

Referring to FIGS. 17 and 18, heating station 176 follows press and seal unit 174 and generally includes: heating station frame 188, conveyor 190 and infrared heating units 192. In the depicted embodiment, infrared heating units 192 are configured to heat eight edges of an insulated glass unit being processed. That is both sided of each edge of a rectangular IGU. Infrared heating units 192 heating units may also be adapted to heat the edges of IGUs that are not rectangular in shape, such as polygonal IGUs, circular IGUs or arch topped IGUs.

In the depicted embodiment, infrared heating units 192 include focused infrared lamps 194 that are linear in nature. This should not be considered limiting. Infrared heating units 192 may be of any desired shape. Focused infrared lamps 194 may be fixed or movable. If they are movable, focused infrared lamps 194 may be movable along with the IGU as it is conveyed. Infrared heating units 192 may include vertical heater 196 and horizontal heater 198. If movable, both vertical heater 196 and horizontal heater 198 may be moved to align with the respective vertical and horizontal edges of an insulated glass unit as it is conveyed.

If fixed, vertical heater 196 and horizontal heater 198 are of sufficient length to heat the height and width of the largest insulated glass unit capable of being processed. If vertical heater 196 is fixed, the insulated glass unit may be paused as it is being conveyed twice to heat vertical edges. Horizontal heater 198 may be used to apply heat to horizontal edges of an insulated glass unit while the insulated glass unit is being conveyed. In this case, horizontal heater 198 is positionable and adjustable as to vertical separation to heat the upper and lower edges of insulated glass units passing through heating station 176 of a variety of heights of IGUs.

Figure 19:
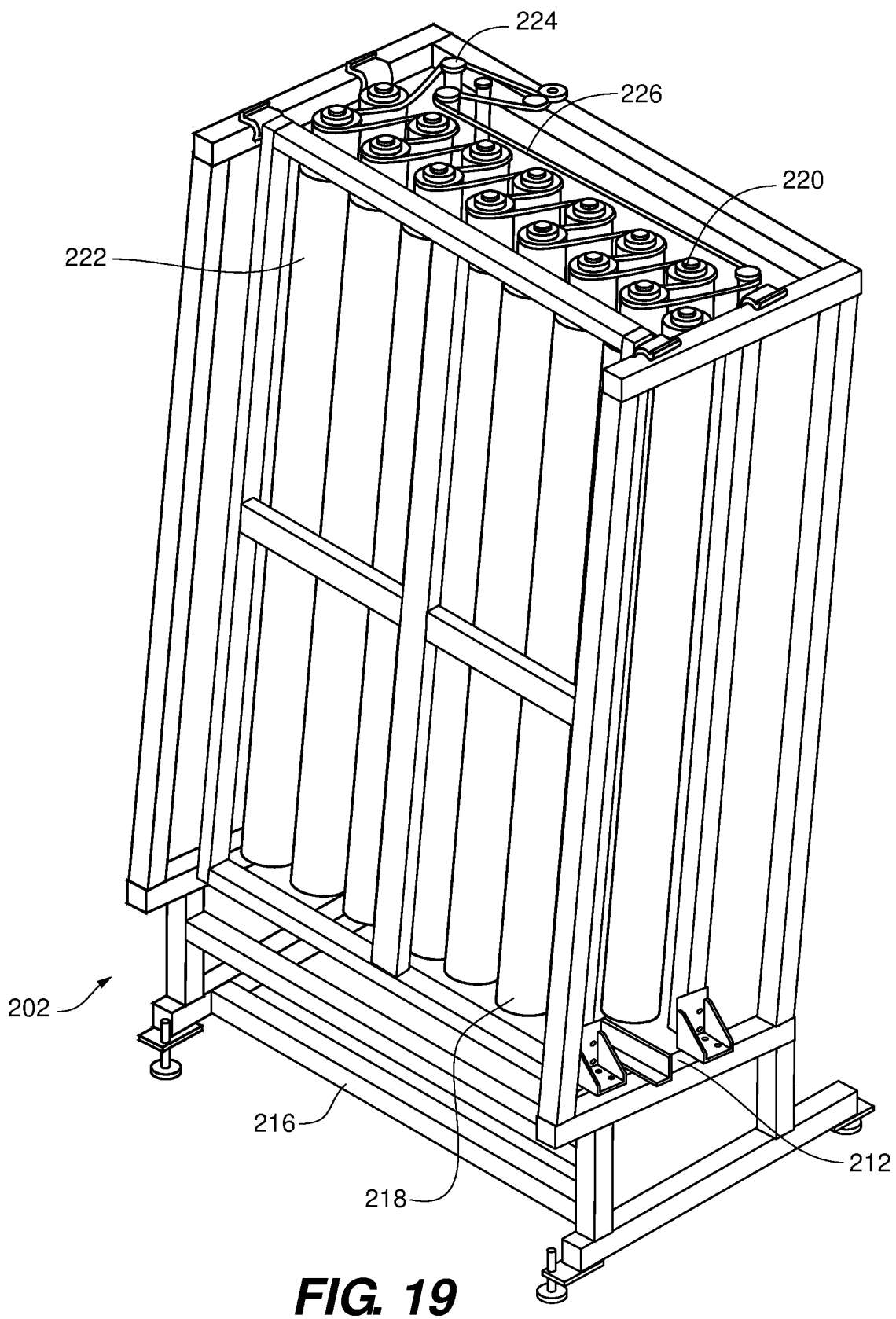
FIG. 19 is perspective view of a vertical sealing roller press according to an example embodiment of the invention.

Referring to FIGS. 19 and 20, vertical press 178 in various embodiments of the invention may include platen press 200 or roller press 202.

Referring to FIGS. 20A and 20B, application of platen press 200 is expected to minimize rebound and the consequent displacement of filler gas contained within an insulated glass unit which still has an open corner. Platen press 200 generally includes: base frame 204, front platen assembly 206, back platen assembly 208, conveyor assembly 212 and platen shifter assembly 214. Base frame 204 supports front platen assembly 206 and back platen assembly 208. At least one of front platen assembly 206 and back platen assembly 208 is movable relative to the other by the operation of platen shifter assembly 214. Conveyor assembly 212 is located slightly below and between front platen assembly 206 and back platen assembly 208 and allows conveying of an insulated glass unit into and out of the space between front platen assembly 206 and back platen assembly 208.

Referring now to FIG. 19, roller press 202 generally includes roller base frame 216, front roller set 218 and back roller set 220. In the depicted embodiment, front roller set 218 includes seven rollers 222 and back roller set 220 includes seven rollers 222. Rollers 222 may be heated. Roller press 202 generally also includes drive motor 224 and serpentine belt or chain 226. Serpentine belt or chain 226 is coupled to drive motor 224 and to idler rollers as depicted in FIG. 19. Use of roller press 202 has the advantage that it allows continuous forward movement of an IGU being processed.

Referring now to FIGS. 21A-24, fourth corner sealer 180 generally includes base frame 228 supporting fourth corner sealing device 230. Fourth corner sealing device 230 may include angled rocking fourth corner sealer 232, roller fourth corner sealer 234 or two-part angled fourth corner sealer 236.

Figure 22:
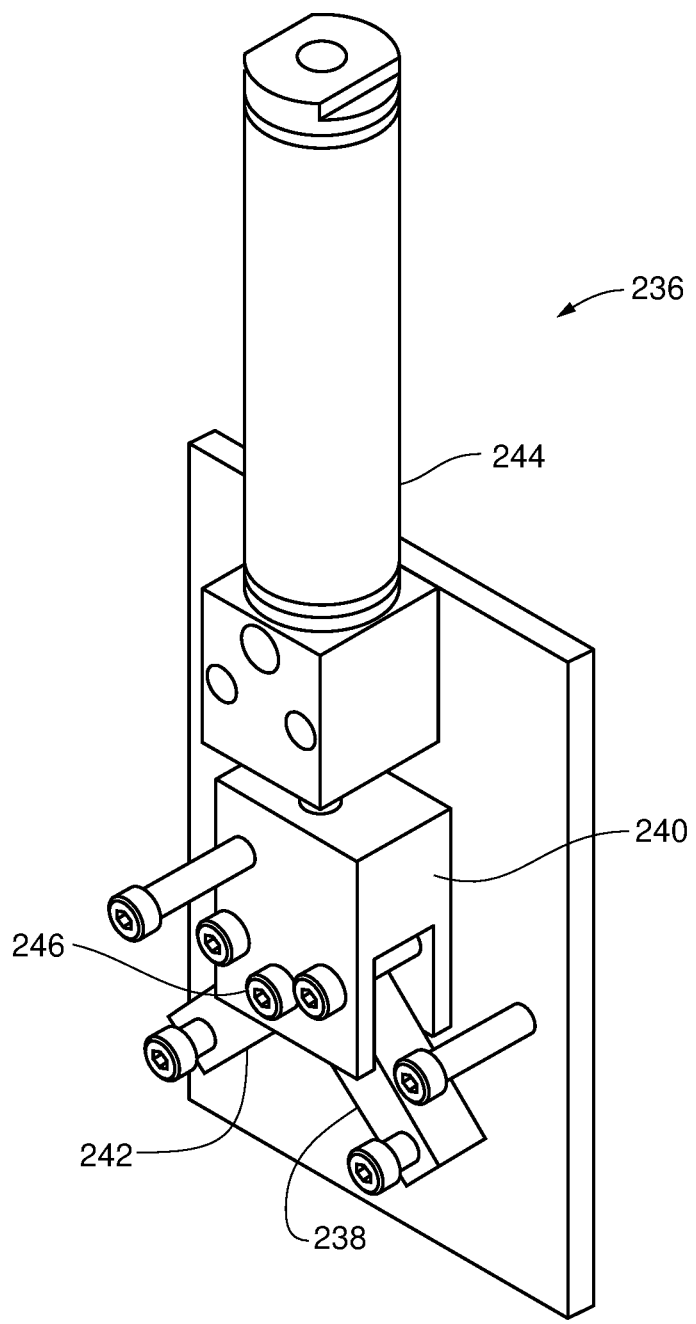
FIG. 22 is a perspective view of a fourth corner sealer incorporating an angled rocking structure according to an example embodiment of the invention.

Referring to FIG. 22, angled rocking fourth corner sealer 232 generally includes angled portion 238 and rocking mechanism 240. Angled portion 238 generally represents an inside corner 242. Rocking mechanism 240 may include linear actuator 244. Angled portion 238 acts about pivot of inside corner 246.

Figure 21A:
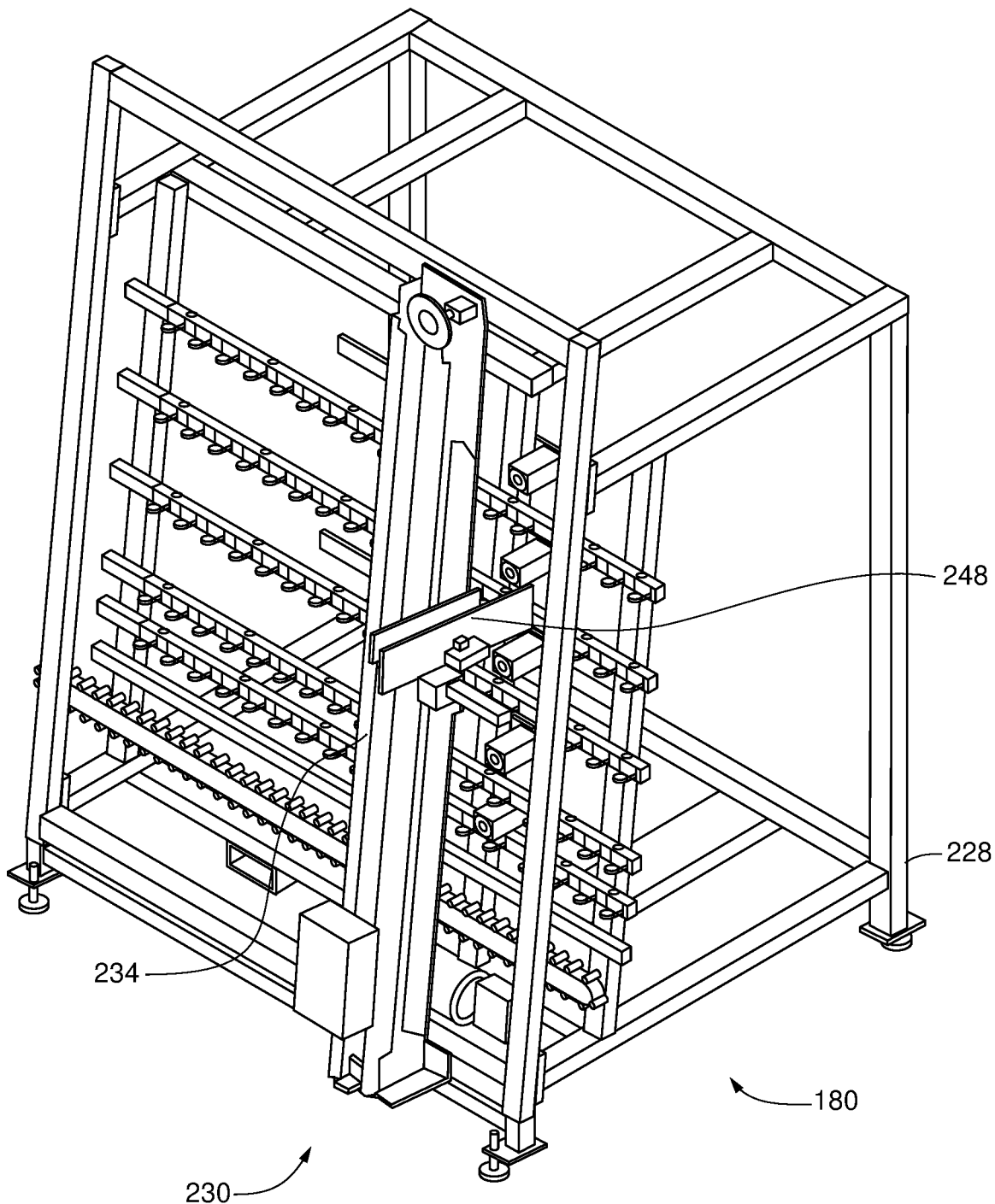
FIG. 21A is a perspective view of a fourth corner sealer incorporating a roller according to an example embodiment of the invention.
Figure 21B:
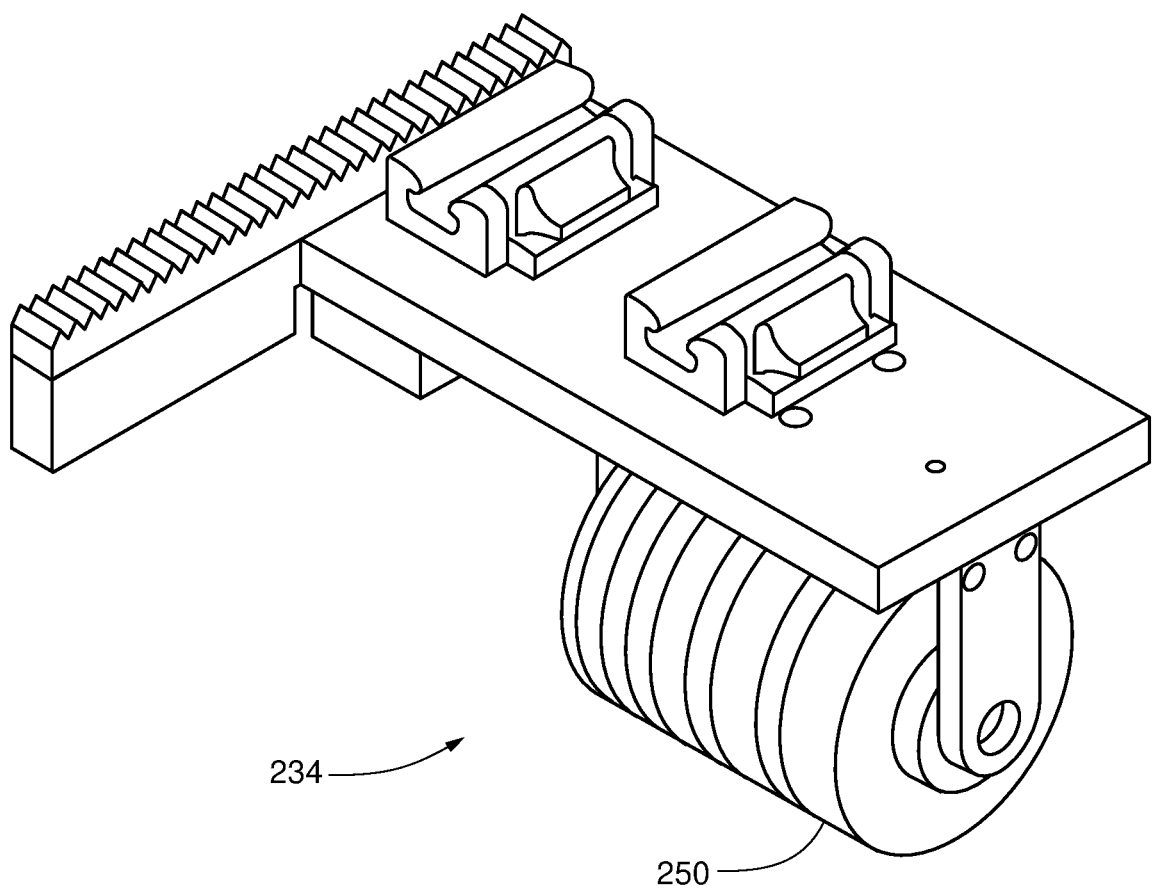
FIG. 21B is a detail perspective view of a fourth corner sealer roller according to an example embodiment of the invention.

Roller fourth corner sealer 234, in an embodiment depicted in FIG. 21B, generally includes linear actuators 248 and corner roller 250. Linear actuators 248 act orthogonally relative to each other and are configured to move corner roller 250 around a corner to be sealed. Corner roller 250 is typically of a diameter much greater than the depth of set back of the spacer of the insulated glass unit and may present multiple rollers of different widths as depicted to accommodate different thickness spacers.

Figure 23:
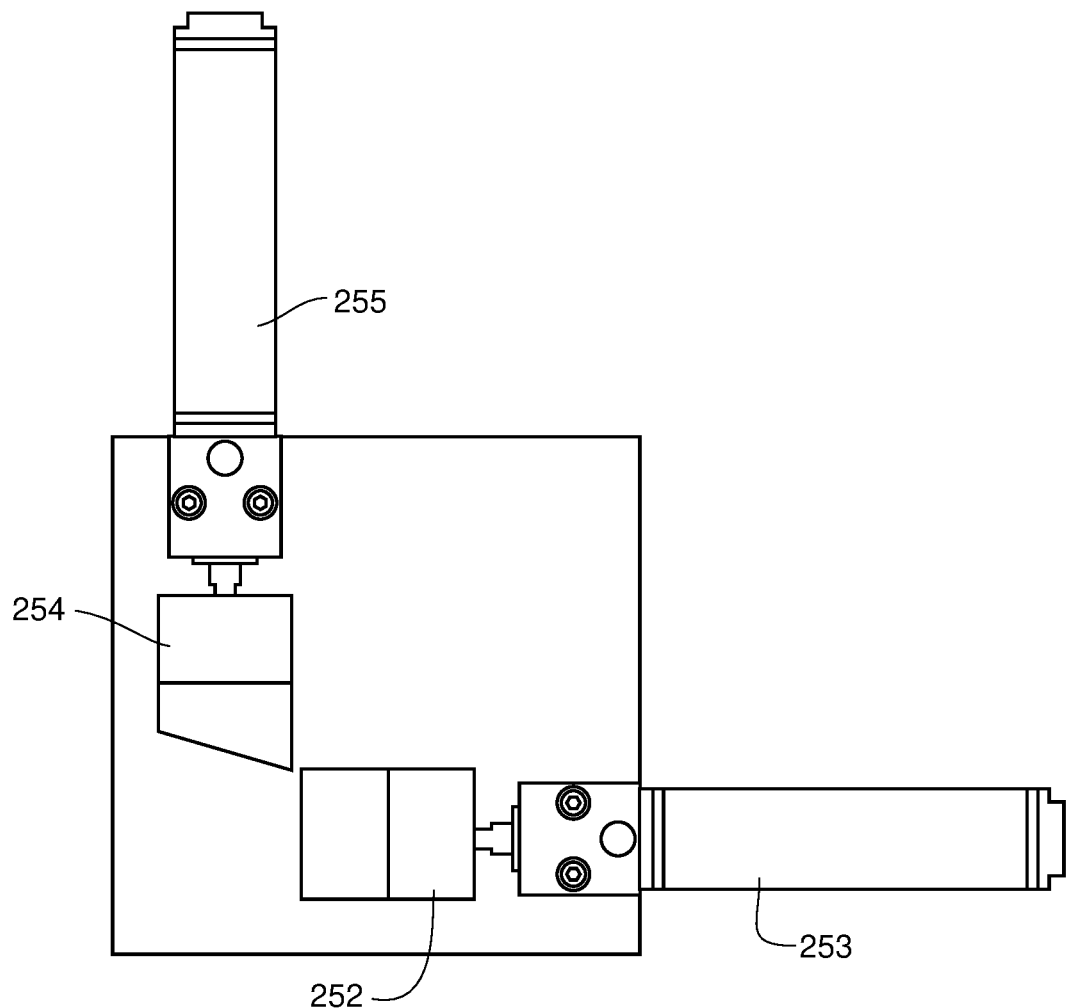
FIG. 23 is a perspective view of a two part angled fourth corner sealer according to an example embodiment of the invention.

Two part angled fourth corner sealer 236, in an embodiment depicted in FIG. 23, generally includes first angled sealer 252 for vertical edge and second angled sealer 254 for horizontal edge, vertical edge linear actuator 253 and horizontal edge linear actuator 255.

Figure 24:
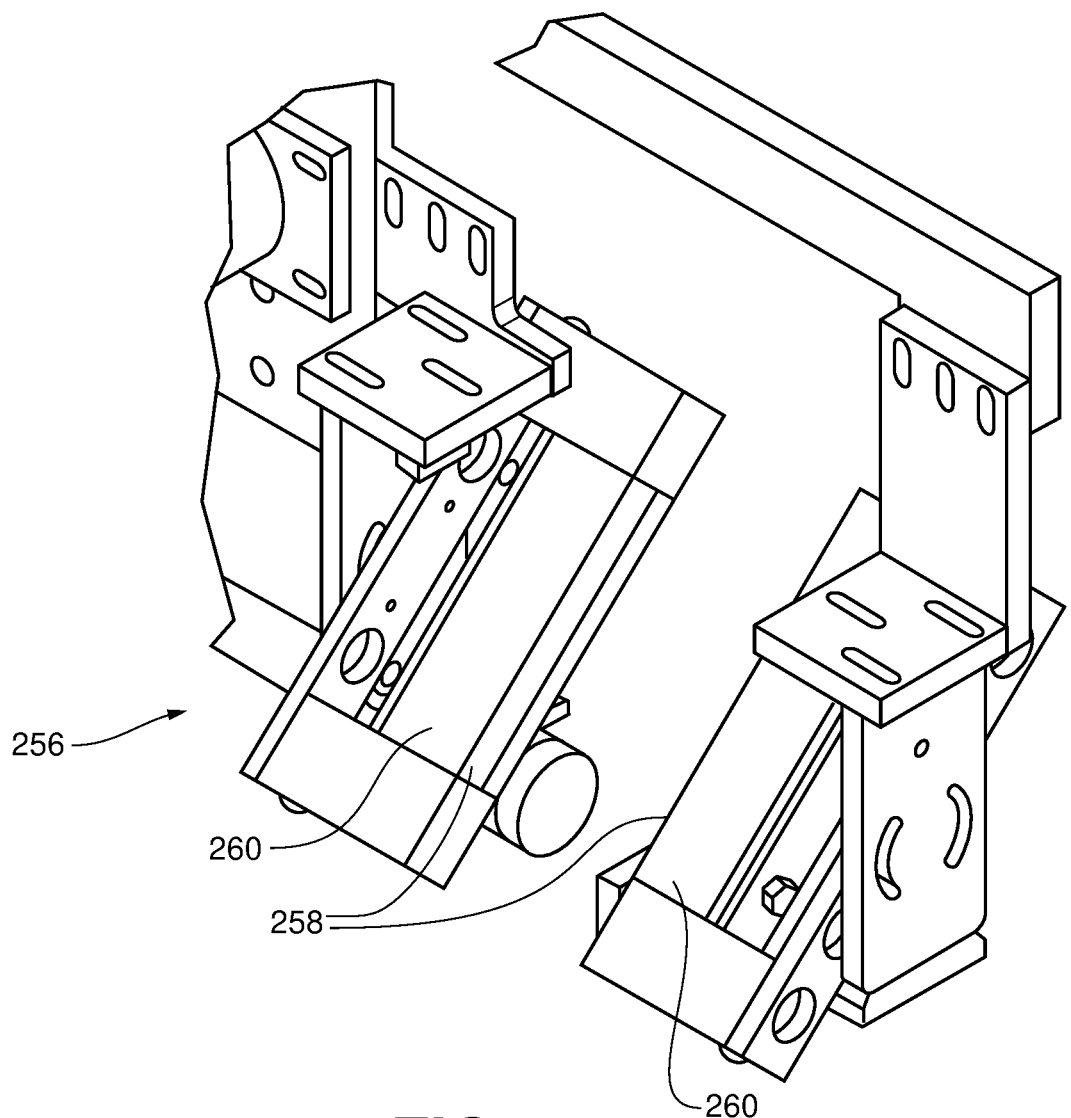
FIG. 24 is a perspective view of a fourth corner infrared heater according to an example embodiment of the invention.

Referring now to FIG. 24, according to an example embodiment, fourth corner sealer 180 includes fourth corner infrared heater 256. In the depicted embodiment fourth corner infrared heater 256 includes two heat lamps 258 inside protective shrouds 260.

According to another embodiment of the invention, with reference to FIGS. 26, 27, 28 and 29, infrared heating units 192 may be individually controlled in a coordinated fashion to heat spacer material 262 along each of eight or more edges of IGU 264 to a desired controlled temperature to facilitate adhesion of spacer adhesive 266 associated with or integral to spacer material 262. Infrared heating units 192 can be individually servo controlled by individual servomotors 265 to control the speed and motion of infrared heating units 192 relative to motion of IGU 264 on each of two sides and four edges of IGU 266.

Figure 27:
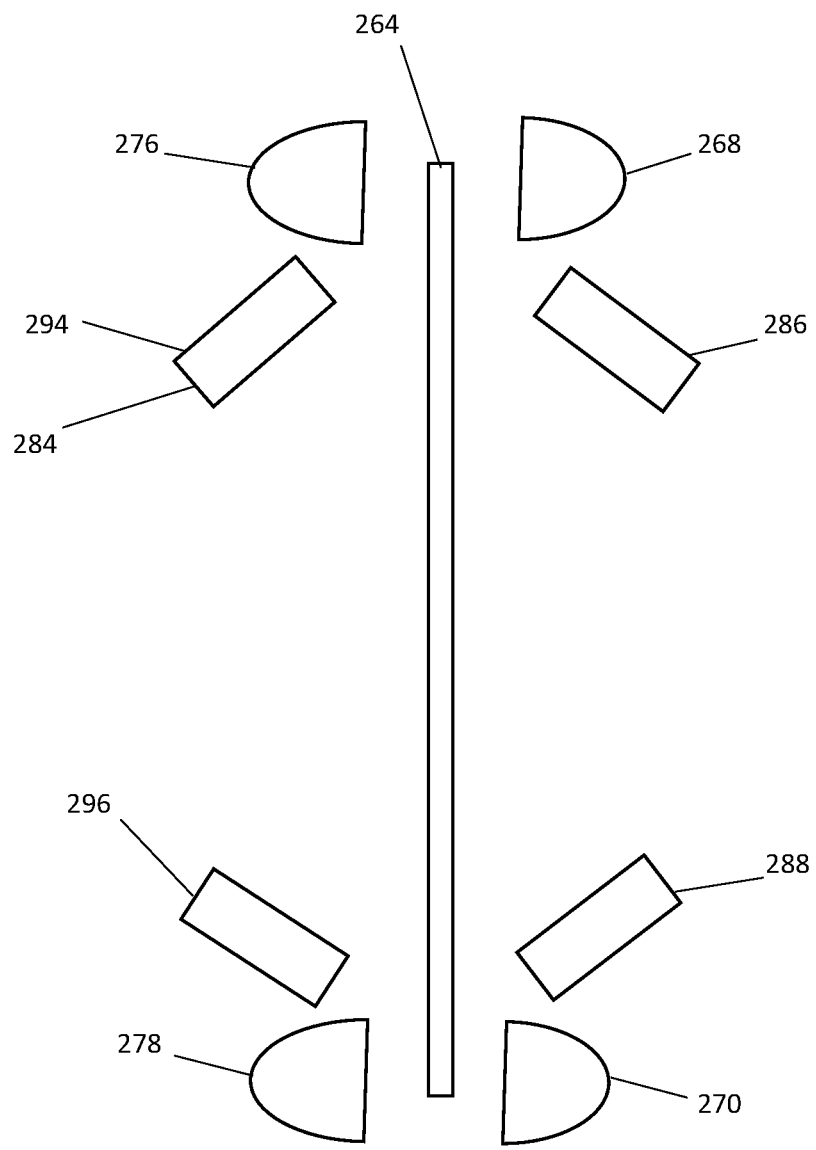
FIG. 27 is a schematic horizontal cross-sectional view of an insulated glass unit and four linear infrared heaters oriented vertically as well as four temperature sensors according to an example embodiment of the invention.
Figure 28:
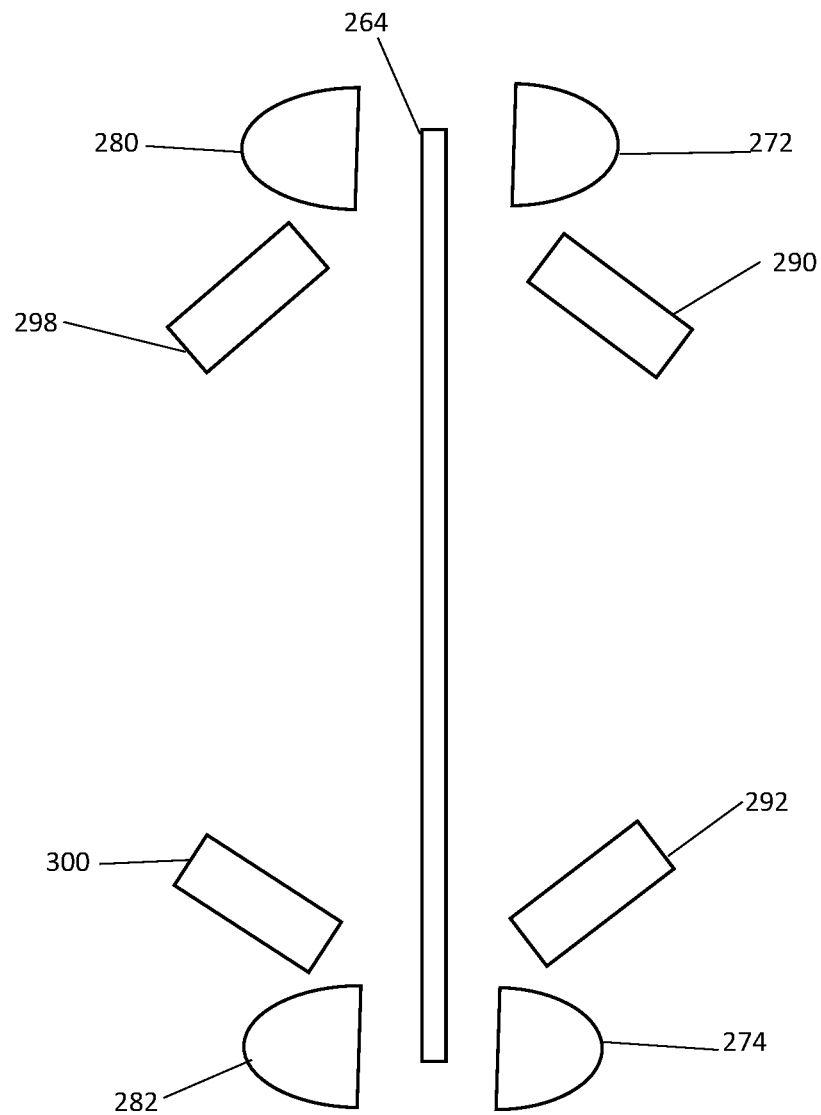
FIG. 28 is a schematic vertical cross-sectional view of the insulated glass unit of FIG. 27 and four linear infrared heaters oriented horizontally as well as four temperature sensors according to an example embodiment of the invention.
Figure 29:
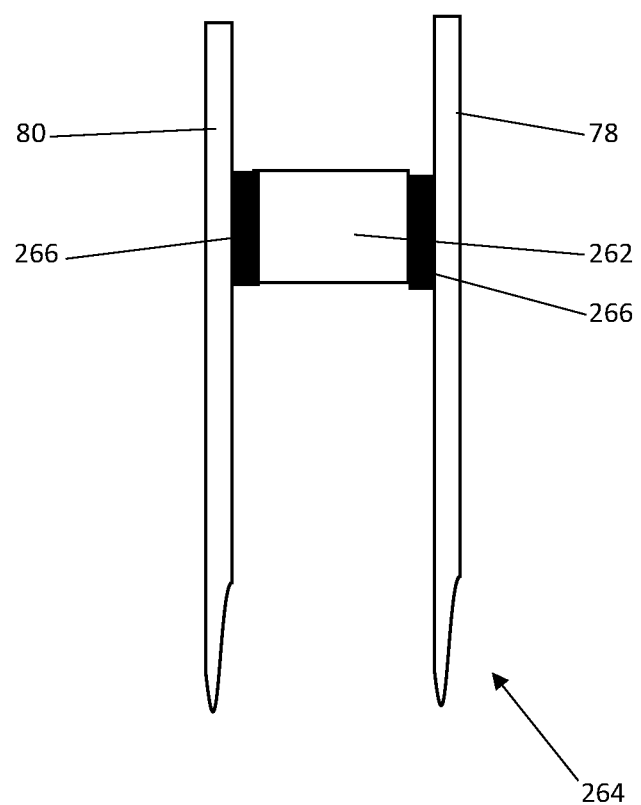
FIG. 29 is a schematic partial depiction of an insulated glass unit and single seal spacer according to an example embodiment of the invention.

In an example embodiment depicted in FIGS. 27 and 28 in horizontal and vertical cross section respectively, infrared heating units 192 include first IR heater 268, second IR heater 270, third IR heater 272, fourth IR heater 274, fifth IR heater 276, sixth IR heater 278, seventh IR heater 280 and eighth IR heater 282. Each of the above infrared heating units 192 includes or is accompanied by individual temperature sensor 284. Temperature sensors 284 are each directed to monitor temperature of spacer material 262 and associated adhesive 266 on each side of spacer material 262. Temperature sensors 284 may include, for example, temperature sensing cameras or other sensors such as thermocouples, RTDs (resistance temperature detectors), thermistors and semiconductor based integrated circuits.

Temperature sensors 284 may include first temperature sensor 286, second temperature sensor 288, third temperature sensor 290, fourth temperature sensor 292, fifth temperature sensor 294, sixth temperature sensor 296, seventh temperature sensor 298 and eighth temperature sensor 300. Each infrared heating unit 192 and each individual temperature sensor 284 is coupled to spacer heating controller 302. Referring again to FIG. 26, spacer heating controller 302 monitors the temperature of spacer material 262 along each of eight or more edges of IGU 264 via temperature sensors 284. Spacer heating controller 302 is operably coupled to each of infrared heating units 192, servomotors 265 and/or to heating station conveyor 304 to modify the temperature of spacer material 262 by a change in speed of heating station conveyor 304 or speed of infrared heating units 192 if they are movable and/or duration or intensity of heating operation each infrared heating unit 192.

First IR heater 268, second IR heater 270, third IR heater 272 and fourth IR heater 274 are, for example, located on a first side of IGU 264 while fifth IR heater 276, sixth IR heater 278, seventh IR heater 280 and eighth IR heater 282 are located on an opposing side of IGU 264.

Similarly, first temperature sensor 286, second temperature sensor 288, third temperature sensor 290 and fourth temperature sensor 292 are located on a first side of IGU 264 while fifth temperature sensor 294, sixth temperature sensor 296, seventh temperature sensor 298 and eighth temperature sensor 300 are located on second opposing side of IGU 264.

First temperature sensor 286 is coupled to spacer heating controller 302 and signals from first temperature sensor 286 are received by spacer heating controller 302 indicating a temperature of spacer adhesive 266 of spacer material 262 in a vicinity of first IR heater 268. If a temperature of spacer adhesive 266 is below a desired temperature for adhesion, spacer heating controller 302 for example, controls first IR heater 268 to increase the intensity of heating of spacer adhesive 266. In another example, if a temperature of spacer adhesive 266 is below a desired temperature to facilitate adhesion, spacer heating controller 302 adjusts heating station conveyor 304 or servomotor 265 to stop or slow to increase the duration of heating of spacer adhesive 266. Alternately, motion of first IR heater 268 can be adjusted to increase duration of heating.

The interconnection and interaction of second temperature sensor 288, third temperature sensor 290, fourth temperature sensor 292, fifth temperature sensor 294, sixth temperature sensor 296, seventh temperature sensor 298 and eighth temperature sensor 300 and respectively second IR heater 270, third IR heater 272, fourth IR heater 274, fifth IR heater 276, sixth IR heater 278, seventh IR heater 280 and eighth IR heater 282 with spacer heating controller 302 and heating station conveyor 304 are similar to those of first temperature sensor 286 and first IR heater 268 and, therefore, will not be further described here.

In operation, glass lites are fed into high speed parallel manufacturing line 50 at infeed station 52. Glass lites are conveyed to washer 54 where they are washed and dried. Glass lites are then conveyed to inspection station 56 for inspection. Then glass lites are conveyed to shuttle 58 which places alternate glass lites on front conveyor 100 or rear conveyor 102. Spacer applied lites 78 are transported on front conveyor 100 while topping lites 80 are transported on rear conveyor 102. Spacer applied lites 78 are then transported to IGU spacer applicator 62 where spacer is applied first to bottom edge 92, then to trailing edge 94, then to top edge 96 and finally to leading edge 98. Spacer is applied while the spacer applied lite 78 is moving forward on the conveyor line. Spacer applied lite 78 and topping lite 80 are then transported via following queue station 64 optionally to driven grid station 66 and then to second queue station 68. Spacer applied lites 78 and topping lites 80 are then conveyed to gas press and fill station 70 which according to alternate embodiments of the invention may include double gas press 108 or single gas press 110. In either case, topping lites 80 are transferred to the front of the gas press and fill station 70 and are mated with spacer applied lite 78 while gas filling takes place. This creates an insulated glass unit that has been primarily sealed. The insulated glass unit is then transported to secondary edge sealer 72 which applies secondary edge sealant via two edge sealing heads including first edge sealing head 144 and second edge sealing head 146. First edge sealing head 144 applies secondary sealant to leading edge 98, top edge 96 and trailing edge 94 of the insulated glass unit in that sequence. Simultaneously, second edge sealing head 146 applies secondary edge sealant to bottom edge 92. During the secondary edge sealing process, edge sealant is wiped at the corners by first corner wiper 152 and second corner wiper 154. Completed insulated glass units having been secondarily edge sealed are then conveyed to non-driven outfeed queue station 74.

According to the embodiment depicted in FIGS. 16-24 when spacer applied lite 78 arrives at single seal IGU spacer applicator 166 single seal spacer material is applied to spacer applied lite 78 along bottom edge 92 followed by trailing edge 94 followed by top edge 96 and leading edge 98 in sequence. The fourth corner of spacer applied light where leading edge 98 and bottom edge 92 meet is left slightly open.

Spacer applied lite 78 is conveyed to press and seal unit 174 where topping lite 80 is mated to spacer applied lite 78 to create an IGU. The IGU is conveyed to heating station 176 where eight edges of the IGU are heated to increase wettability of the single seal IGU spacer adhesive. If infrared heating units 192 are moveable they are moved to heat areas of the IGU as required. The IGU is then conveyed to vertical press 178 where the IGU is pressed to enhance the seal between the lites and the single seal spacer material. The fourth corner of the IGU remains open after application of vertical press 178.

The IGU is then conveyed to fourth corner sealer 180 where the fourth corner is sealed trapping a non-air filling gas within the IGU. If present, fourth corner heater 256 may be applied to raise the temperature of the fourth corner to facilitate sealing.

Figure 26:
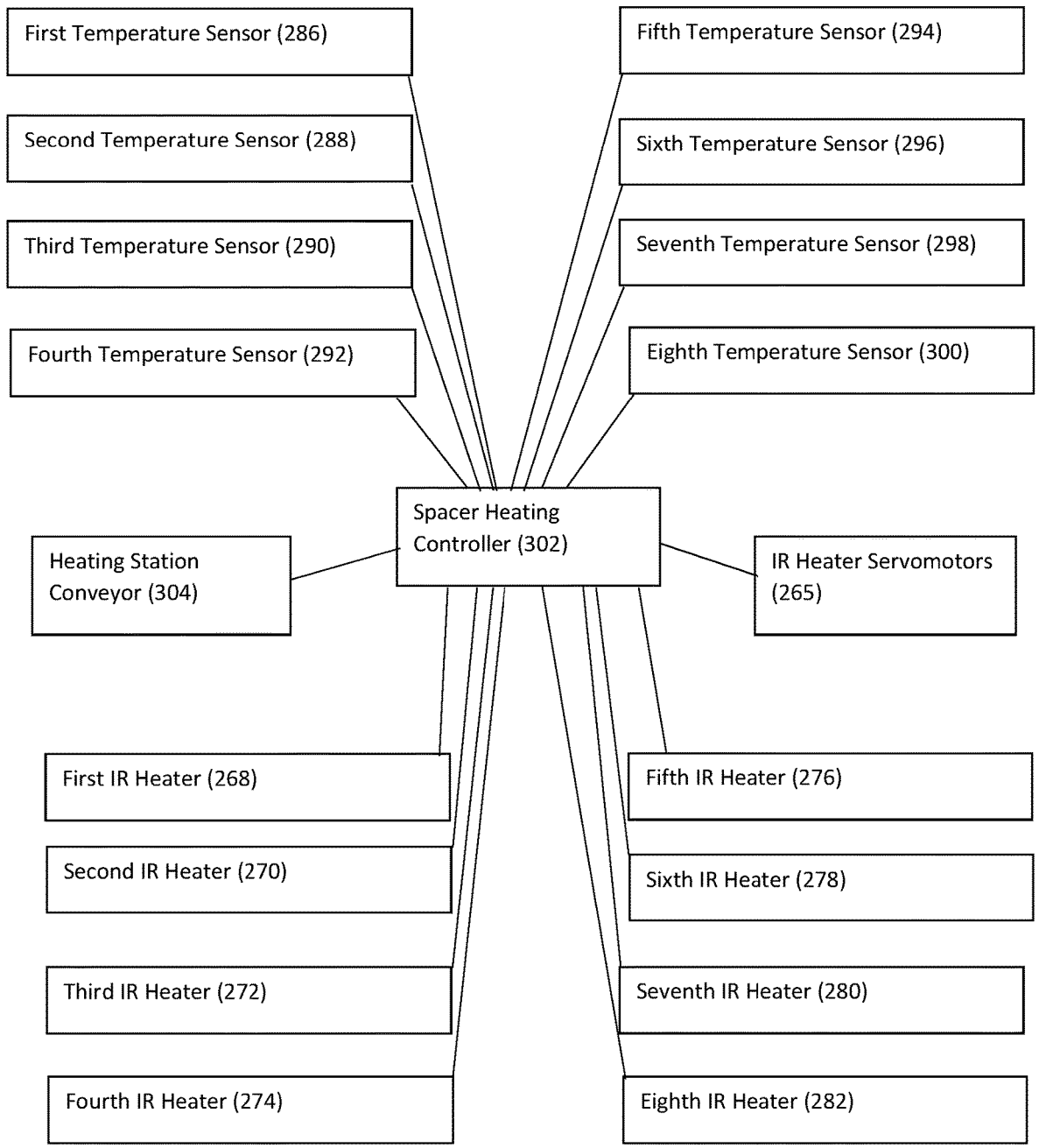
FIG. 26 is a schematic block diagram of temperature sensors, infrared heaters and a closed loop feedback arrangement including a controller and heating station conveyor according to an example embodiment of the invention.

Referring to FIGS. 26, 27 and 28, first temperature sensor 286 is coupled to spacer heating controller 302 and sends signals from first temperature sensor 286 that are received by spacer heating controller 302 indicating a temperature of spacer adhesive 266 of spacer material 262 in a vicinity of first IR heater 268. Spacer heating controller 302 receives and processes signals from each of temperature sensors 284. If a temperature of spacer adhesive 266 is below a desired temperature for facilitating adhesion, spacer heating controller 302 for example, controls first IR heater 268 to increase the intensity or duration of heating of spacer adhesive 266. In another example, if a temperature of spacer adhesive 266 is below a desired temperature for adhesion, spacer heating controller 302 adjusts heating station conveyor 304 to stop or slow to increase the duration of heating of spacer adhesive 266. Spacer heating controller 302 can alter several of the above factors in combination to achieve desired temperature of space adhesive 266.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method of facilitating adhesion of spacer material having an integrated contact adhesive to lites of an insulating glass unit (IGU), comprising:
   applying the spacer material having the integrated contact adhesive to at least a spacer applied lite of the IGU;
   in an ambient temperature environment individually monitoring a local temperature of portions of the spacer material of an individual insulated glass unit, portions of the integrated contact adhesive associated with the spacer material of the individual insulated glass unit or both proximate at least one location of the portions where the integrated contact adhesive is in contact or proximate contact with the lites of the insulated glass unit by application of individual temperature sensors wherein each of the individual temperature sensors is associated with an individual focused infrared heater;
   identifying the portions of the spacer material where a local ambient temperature of the integrated contact adhesive is below a desired temperature to facilitate adhesion between the integrated contact adhesive and lites of the insulated glass unit because of reduced wettability of the integrated contact adhesive below the desired temperature of the adhesive that inhibits adhesion of the integrated contact adhesive with the lites of the insulated glass unit;
   selectively applying focused infrared energy to at least the portions of the spacer material where the local temperature of the integrated contact adhesive is below a desired temperature to facilitate adhesion until the local temperature is raised to facilitate wettability and adhesion of the integrated contact adhesive with the lites of the insulated glass unit; and identifying the portions of the spacer material where the local ambient temperature of the integrated contact adhesive is at the desired temperature to facilitate adhesion between the integrated contact adhesive and lites of the insulated glass unit and maintaining the integrated contact adhesive at the desired temperature.

2. The method as claimed in claim 1, further comprising utilizing at least one temperature sensor on a first linear side of the IGU to sense temperature on the first linear side and controlling a focused linear infrared heater to apply the focused infrared energy to the one linear side.

3. The method as claimed in claim 1, further comprising selectively applying focused infrared energy by increasing an intensity of the focused infrared energy.

4. The method as claimed in claim 1, further comprising selectively applying focused infrared energy by increasing a duration of application of the focused infrared energy.

5. The method as claimed in claim 4, further comprising increasing the duration of application of the focused infrared energy by adjusting a speed of movement of a conveyor supporting and moving the insulated glass unit or adjusting movement of a servomotor associated with an infrared heater.

6. The method as claimed in claim 4, further comprising increasing the duration of application of the focused infrared energy by adjusting a speed of movement of a source of the focused infrared energy relative to the insulated glass unit.

7. The method as claimed in claim 1, further comprising individually monitoring the local temperature by use of at least one temperature sensitive camera.

8. The method as claimed in claim 1, further comprising individually monitoring the local temperature by use of the individual temperature sensors which are operably coupled to a closed loop feedback arrangement including a controller and heating station conveyor.

9. The method as claimed in claim 1, further comprising individually monitoring a local temperature by utilizing eight temperature sensors located on two opposing sides of four edges of the insulated glass unit and selectively applying focused infrared energy by utilizing eight focused infrared energy sources located on the two opposing sides of the four edges of the insulated glass unit.

\* \* \* \* \*